United States Patent
Wang et al.

(10) Patent No.: US 12,245,195 B2
(45) Date of Patent: Mar. 4, 2025

(54) SIDELINK REPEATING OPERATIONS

(71) Applicant: QUALCOMM Incorporated, San Diego, CA (US)

(72) Inventors: Xiaojie Wang, Hillsborough, NJ (US); Navid Abedini, Basking Ridge, NJ (US); Jianghong Luo, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 17/530,322

(22) Filed: Nov. 18, 2021

(65) Prior Publication Data
US 2023/0156664 A1    May 18, 2023

(51) Int. Cl.
| | | |
|---|---|---|
| *H04W 72/02* | (2009.01) | |
| *H04L 1/08* | (2006.01) | |
| *H04W 72/0446* | (2023.01) | |
| *H04W 72/23* | (2023.01) | |
| *H04W 72/51* | (2023.01) | |
| *H04W 92/18* | (2009.01) | |

(52) U.S. Cl.
CPC .............. *H04W 72/02* (2013.01); *H04L 1/08* (2013.01); *H04W 72/0446* (2013.01); *H04W 72/23* (2023.01); *H04W 72/51* (2023.01); *H04W 92/18* (2013.01)

(58) Field of Classification Search
CPC ..... H04W 72/02; H04W 72/51; H04W 72/23; H04W 72/0446; H04W 92/18; H04W 72/40; H04W 72/25; H04L 1/08; H04L 1/1887; H04L 1/1854; H04L 1/189; H04L 1/1896

USPC ......................................................... 370/329
See application file for complete search history.

(56) References Cited

U.S. PATENT DOCUMENTS

| | | | |
|---|---|---|---|
| 11,991,002 B2* | 5/2024 | Kwak | H04L 1/1819 |
| 2016/0066197 A1* | 3/2016 | Park | H04B 7/0695 |
| | | | 370/329 |
| 2016/0345318 A1* | 11/2016 | Bhandaru | H04L 67/141 |
| 2019/0037495 A1* | 1/2019 | John Wilson | H04W 56/001 |
| 2021/0377993 A1* | 12/2021 | Ayaz | H04L 5/0037 |
| 2022/0052764 A1* | 2/2022 | Medra | H04B 10/614 |
| 2022/0141678 A1* | 5/2022 | Newman | H04W 52/08 |
| | | | 370/329 |

(Continued)

FOREIGN PATENT DOCUMENTS

CN        117882315 A  *  4/2024  ......... H04B 7/04013

*Primary Examiner* — Rownak Islam
(74) *Attorney, Agent, or Firm* — Patterson & Sheridan LLP

(57) ABSTRACT

Aspects of the present disclosure provide techniques for sidelink repeating operations, such as by using an assisting node (e.g., a smart repeater, relay, or reflector) to enhance sidelink communication reliability. For example, one or more assisting nodes may be configured by a network entity and repeat sidelink communications for two or more user equipments (UEs). In aspects, an assisting node may receive, from the network entity, an indication of resources available for sidelink communications between a first UE and a second UE. The assisting node may also receive signaling that configures the assisting node to repeat sidelink communications between the first and the second UEs over the indicated resources. The assisting node then repeats sidelink communications between the first and the second UEs according to the received signaling.

22 Claims, 23 Drawing Sheets

(56) References Cited

U.S. PATENT DOCUMENTS

| | | | | |
|---|---|---|---|---|
| 2022/0322365 A1* | 10/2022 | Yoshioka | .............. | H04W 72/12 |
| 2023/0058037 A1* | 2/2023 | Yeo | ................... | H04W 72/0453 |
| 2023/0209412 A1* | 6/2023 | Liu | ....................... | H04L 5/0055 |
| | | | | 370/329 |
| 2024/0072849 A1* | 2/2024 | Haija | ................. | H04B 7/06952 |
| 2024/0090050 A1* | 3/2024 | Fujishiro | ............... | H04W 48/16 |

\* cited by examiner

1300

A METHOD FOR WIRELESS COMMUNICATIONS BY A FIRST USER EQUIPMENT (UE)

1302
TRANSMIT, TO AN ASSISTING NODE, A SIDELINK TRANSMISSION BEAMFORMED FROM THE FIRST UE TOWARD THE ASSISTING NODE, THE SIDELINK TRANSMISSION REPEATED BY THE ASSISTING NODE TO A SECOND UE

1304
RECEIVE, FROM THE ASSISTING NODE, SIDELINK RETRANSMISSIONS REPEATED BY THE ASSISTING NODE AND FROM THE SECOND UE

FIG. 13

SIDELINK REPEATING OPERATIONS

BACKGROUND

Field of the Disclosure

Aspects of the present disclosure relate to wireless communications, and more particularly, to device-to-device sidelink communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink communications generally refer to communications between devices (e.g., between UEs). As the demand for mobile broadband access continues to increase, the demand for improvements to sidelink communications increases as well.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by an assisting node. The method generally includes receiving, from a network entity, an indication of resources available for sidelink communications between a first user equipment (UE) and a second UE. The method includes receiving, from the network entity, signaling that configures the assisting node to repeat sidelink communications between the first and the second UEs over the indicated resources. The method further includes repeating sidelink communications between the first and the second UEs according to the received signaling.

Certain aspects of this disclosure provide an assisting node including at least one processor and a memory. The at least one processor and the memory are configured to: receive, from a network entity, an indication of resources available for sidelink communications between a first user equipment (UE) and a second UE; receive, from the network entity, signaling that configures the assisting node to repeat sidelink communications between the first and the second UEs over the indicated resources; and repeat sidelink communications between the first and the second UEs according to the received signaling.

Certain aspects of this disclosure provide an assisting node for wireless communications. The assisting node includes means for receiving, from a network entity, an indication of resources available for sidelink communications between a first user equipment (UE) and a second UE; means for receiving, from the network entity, signaling that configures the assisting node to repeat sidelink communications between the first and the second UEs over the indicated resources; and means for repeating sidelink communications between the first and the second UEs according to the received signaling.

Certain aspects of this disclosure provide a method for wireless communications by a network entity. The method generally includes transmitting, to an assisting node, an indication of resources available for sidelink communications between a first UE and a second UE; transmitting, to the assisting node, signaling that configures the assisting node to repeat sidelink communications between the first and the second UEs over the indicated resources; and monitoring operations of the assisting node that repeats sidelink communications between the first and the second UEs according to the signaling.

Certain aspects of this disclosure provide a network entity including at least one processor and a memory. The at least one processor and the memory are configured to: transmit, to an assisting node, an indication of resources available for sidelink communications between a first UE and a second UE; transmit, to the assisting node, signaling that configures the assisting node to repeat sidelink communications between the first and the second UEs over the indicated resources; and monitor operations of the assisting node that repeats sidelink communications between the first and the second UEs according to the signaling.

Certain aspects of this disclosure provide a network entity for wireless communications. The network entity includes means for transmitting, to an assisting node, an indication of resources available for sidelink communications between a first UE and a second UE; means for transmitting, to the assisting node, signaling that configures the assisting node to repeat sidelink communications between the first and the second UEs over the indicated resources; and means for monitoring operations of the assisting node that repeats sidelink communications between the first and the second UEs according to the signaling.

Certain aspects of this disclosure provide a method for wireless communications by a first UE. The method generally includes transmitting, to an assisting node, a sidelink transmission beamformed from the first UE toward the assisting node, the sidelink transmission repeated by the assisting node to a second UE; and receiving, from the assisting node, sidelink retransmissions repeated by the assisting node and from the second UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 13 illustrates example operations for wireless communications by a UE, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
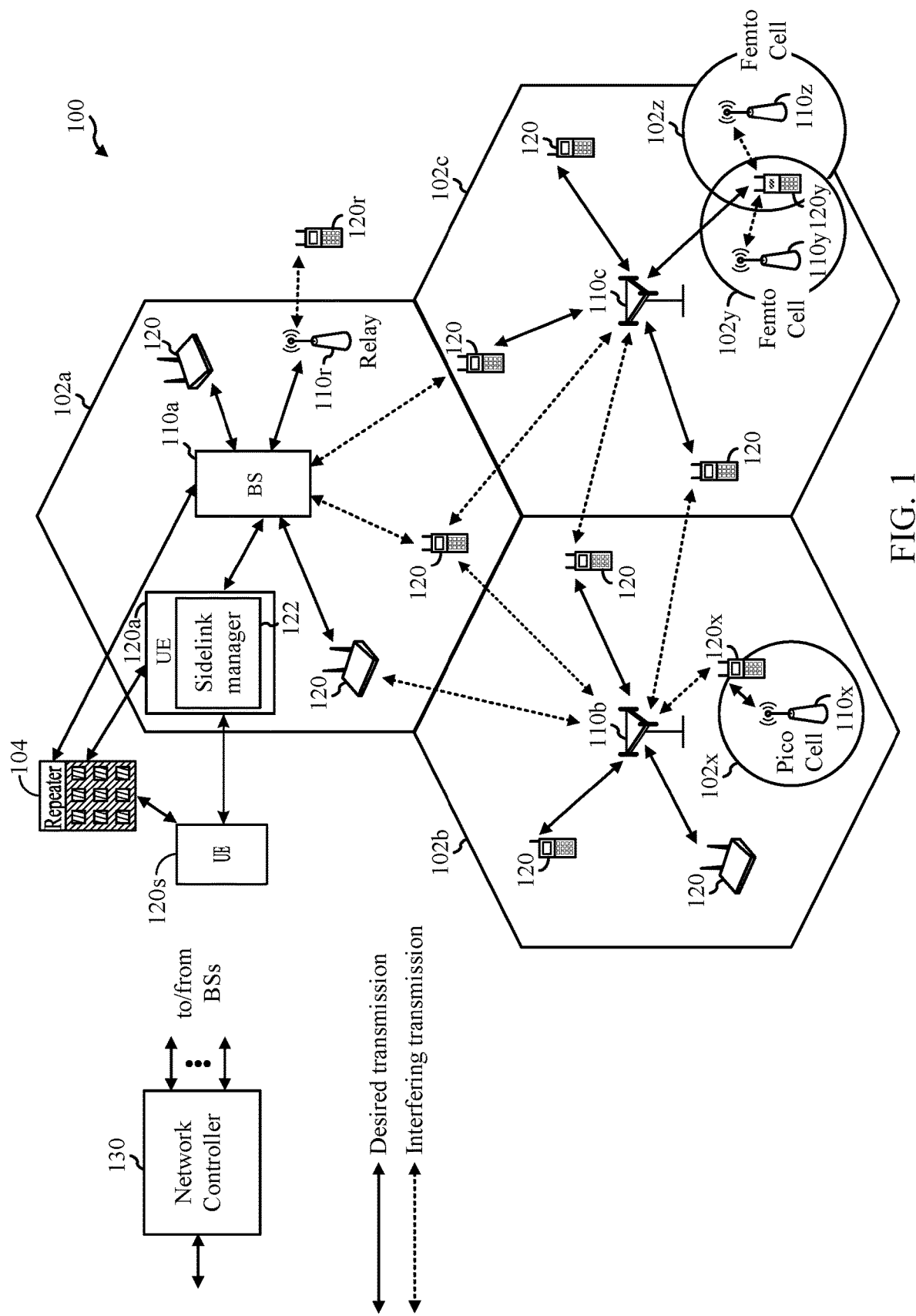
FIG. 1 is a block diagram conceptually illustrating an example telecommunications system, in accordance with certain aspects of the present disclosure.

Aspects of the present disclosure provide apparatus, methods, processing systems, and computer readable mediums for sidelink communications. For example, according to certain aspects an assisting node (e.g., a smart repeater, relay, or reflector) may be configured to participate in repeating operations to enhance sidelink communication reliability. For example, one or more assisting nodes may be configured by a network entity and repeat sidelink communications for two or more user equipments (UEs).

In aspects, an assisting node may receive, from the network entity, an indication of resources available for sidelink communications between a first UE and a second UE. The assisting node may also receive signaling that configures the assisting node to repeat sidelink communications between the first and the second UEs over the indicated resources. The assisting node then repeats sidelink communications between the first and the second UEs according to the received signaling.

In some cases, the assisting node may include a relay or a reflector, such as a reconfigurable intelligent surface (RIS). The relay or reflector may actively (e.g., powered and with signal amplification if needed) or passively (e.g., without additional power or amplification) provide a second channel between two UEs, or, a UE and a transmit-receive point (TRP). Hereinafter, the assisting node is interchangeable with the term "repeater" that refers to both active and passive types of relays or reflectors.

In general, a UE or a network entity (e.g., a base station, such as a gNB, or any TRP) may communicate with another UE via a repeater, meaning transmissions from the network entity are relayed or reflected by the repeater to the UE. In some cases, both the network entity and the UE may be configured to perform beamforming with the repeater. For example, in additional to the existing beamforming configuration between the network entity and the UE, each of the network entity and the UE may separately perform beam training with the repeater to establish a separate signal path. Beamforming uses multiple radiating elements (e.g., antennas) transmitting the same signal at an identical wavelength and phase to create a collective antenna that provides a directional and targeted signal stream by reinforcing the radio waves in a specific direction. The assisting node may transmit or receive beams in certain directions that can be configured or reconfigured. As such, the network entity, the sidelink UEs, and the assisting nodes may be trained to have specific beamforming configurations toward each other.

In order to improve sidelink reliability, the repeater may need to be correctly configured to repeat sidelink communications (e.g., activation, resource allocation, and beamforming, etc.). The present disclosure provides various techniques for sidelink repeating operations, such as to improve reliability, energy efficiency (e.g., activation only when needed), and allow for different levels of control granularity for different applications. For example, in a setting of industrial internet of things (IIoT), numerous programmable logic controllers (PLCs) may communicate with many sensors and/or actuators (S/As) with low latency yet high reliability requirements. Both PLCs and S/As are UEs that may communicate with each other via sidelink communications (e.g., PC5 interface). Although the direct sidelink communications between PLCs and S/As are preferred, such direct sidelink communications may nonetheless be disrupted.

The assisting nodes and techniques disclosed herein provide an alternative signal path (e.g., with PC5 interface capabilities) and repeating operations between the PLCs and S/As, which may help improve reliability and overall system performance.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. The wireless communication network 100 may include one or more UEs 120, including one or more sidelink UEs 120s. A repeater 104 (i.e., an assisting node) may assist communications in both Uu and PC5 interfaces. The assisting node or repeater 104 may be configured to perform operations 1100 described below with reference to FIG. 11. The base station (BS) 110a may be configured to perform operations 1200 described below with reference to FIG. 12. One or more UEs 120a may be configured to perform operations 1300 described below with reference to FIG. 13.

As illustrated in FIG. 1, the wireless communication network 100 may include a number of base stations (BSs) 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured to establish direct sidelink communications with another UE, such as the UE 120s. As shown in FIG. 1, the UE 120a includes a sidelink manager 122. The sidelink manager 122 may be configured to transmit a sidelink communication to the UE 120s, in accordance with aspects of the present disclosure. Furthermore, the UEs 120a and 120s may utilize the sidelink repeating operations provided by the repeater 104. For example, the repeater 104, when activated, repeats the sidelink transmissions between the UEs 120a and 120s, such as when the direct sidelink therebetween is disrupted or blocked.

For example, communication between the UEs 120a and 120s may be blocked by obstacles and require assistance from the repeater 104, which may be a reconfigurable intelligent surface (RIS). The repeater 104 may re-radiate (e.g., reflect or refract) transmissions in an alternate signal path. In some cases, the repeater 104 may be configured with a trained beamforming configuration to allow a beam from one of the UEs 120a and 120s to be re-radiated off the repeater 104 to reach the other. The direction of the re-radiation by the repeater 104 may be controlled or reconfigured by the BS 110a or a controller. The BS 110a may also provide indications of available sidelink resources between the UEs 102a and 102s.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
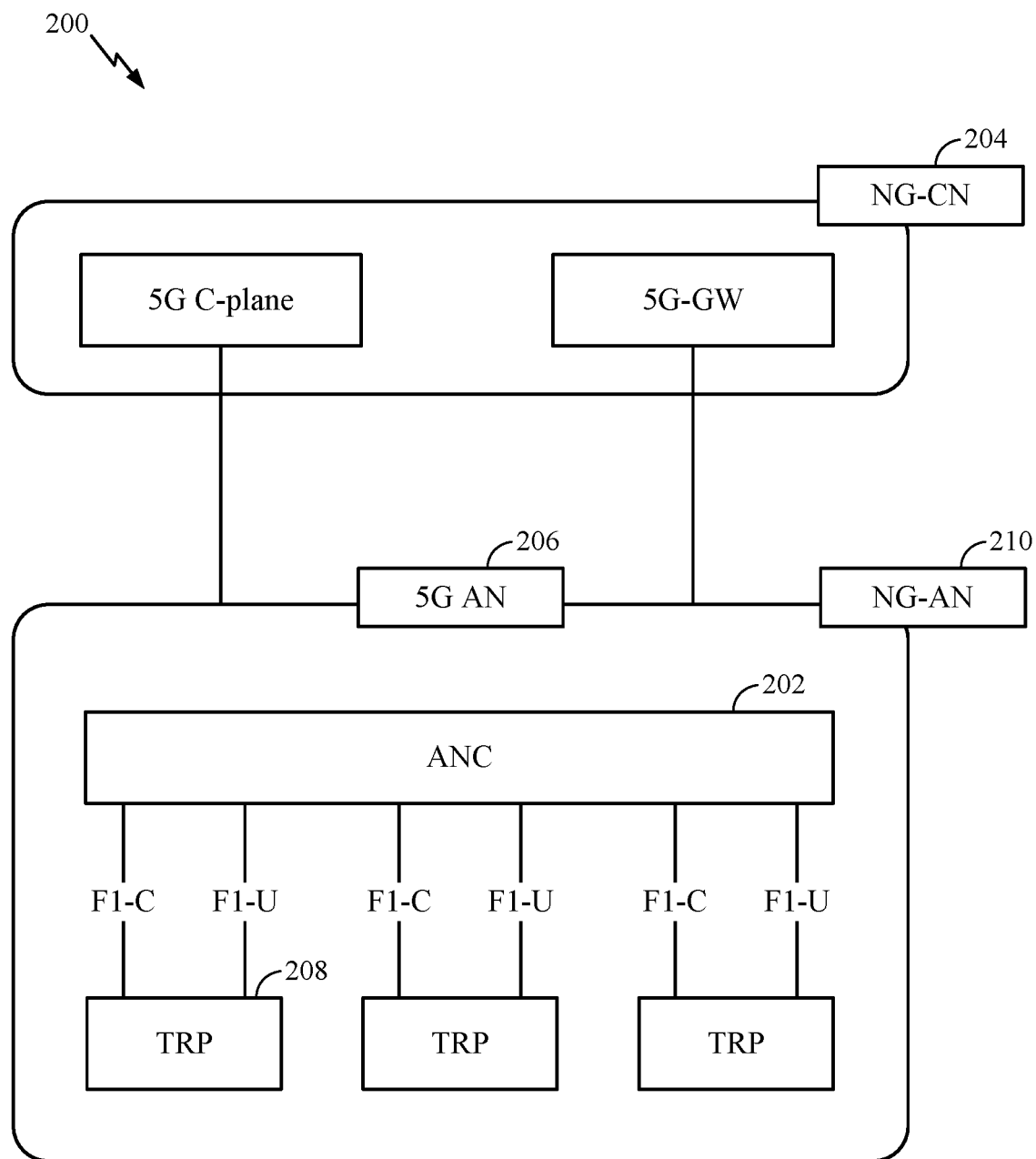
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
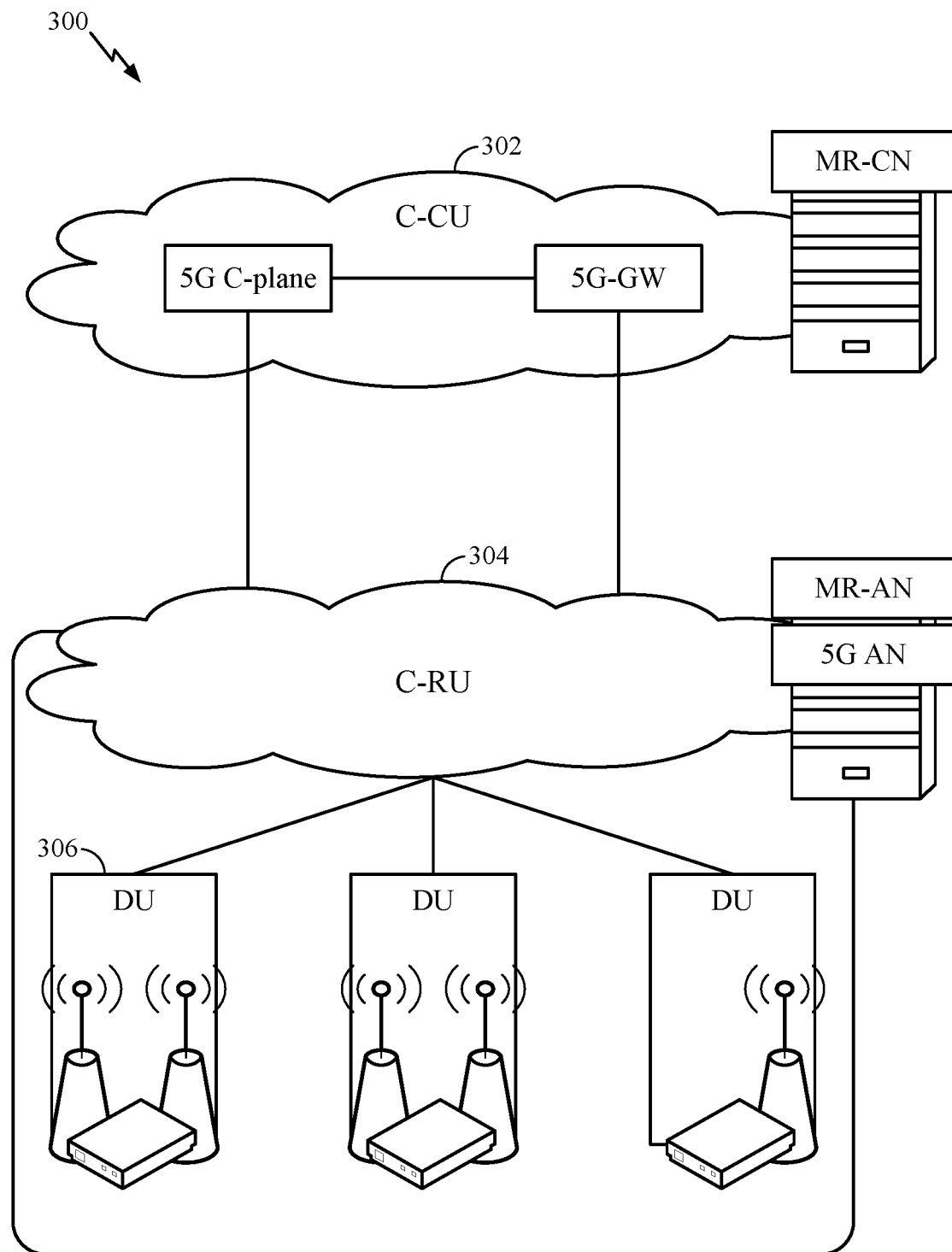
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
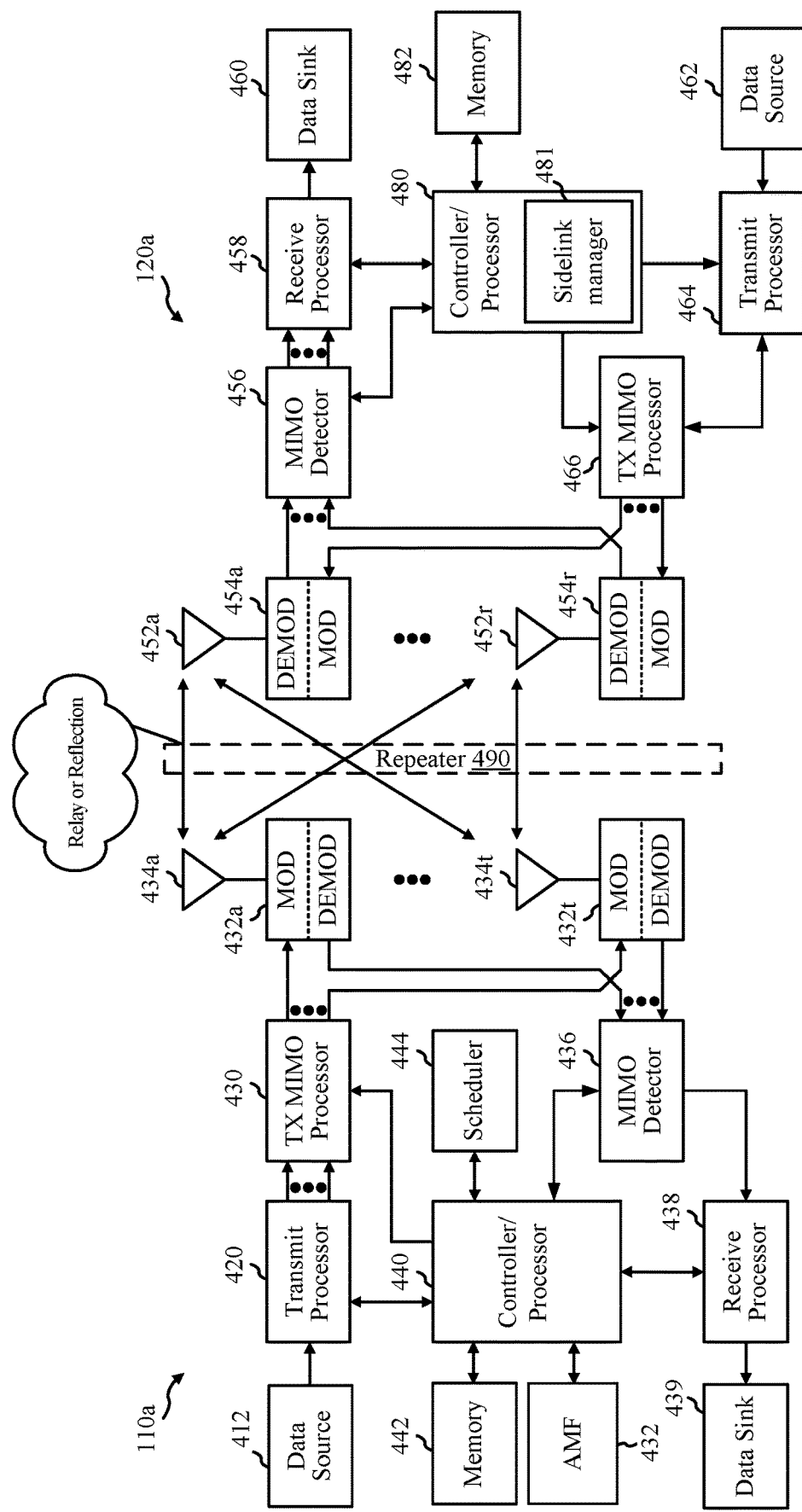
FIG. 4 is a block diagram conceptually illustrating a design of an example base station (BS) and user equipment (UE), in accordance with certain aspects of the present disclosure.

FIG. 4 illustrates example components of BS 110a and UE 120a (as depicted in FIG. 1), which may be used to implement aspects of the present disclosure. The repeater 490 as shown may re-radiate signals between the BS 110a and UE 120a, in addition to re-radiating signals between the UEs 120a and 120s as discussed in relation to FIG. 1. For example, the repeater 490 may be used to perform the various techniques and methods described herein with reference to FIG. 11. The antennas 434, processors 430, 438, 420, and/or controller/processor 440 of the BS 110a may be used to perform the various techniques and methods described herein with reference to FIG. 12. The antennas 452, processors 466, 458, 464, and/or controller/processor 480 of the UE 120a may be used to perform the various techniques and methods described herein with reference to FIG. 13.

In some cases, the repeater 490 may be reconfigured or controlled by the BS 110a or a controller (not shown). Each antenna element on the repeater 490 may re-radiate radio signals with certain phase or amplitude changes, such as phase shifts. The BS 110a or controller may reconfigure the phase or amplitude changes by applying a precoding weight to each antenna element to enable the repeater 490 to re-radiate an output beam at different directions given a particular input beam. Therefore, the repeater 490 may be configured with specific beamforming properties with respect to each of the UEs 120a, 120s, and the BS 110a.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120*a*, the antennas 452*a* through 452*r* may receive the downlink signals from the base station 110*a* and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120*a* to a data sink 460, and provide decoded control information to a controller/processor 480.

On the uplink, at UE 120*a*, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110*a*. At the BS 110*a*, the uplink signals from the UE 120*a* may be received by the antennas 434, processed by the modulators 432, detected by a MIMO detector 436 if applicable, and further processed by a receive processor 438 to obtain decoded data and control information sent by the UE 120*a*. The receive processor 438 may provide the decoded data to a data sink 439 and the decoded control information to the controller/processor 440.

The controllers/processors 440 and 480 may direct the operation at the BS 110*a* and the UE 120*a*, respectively. The processor 440 and/or other processors and modules at the BS 110*a* may perform or direct the execution of processes for the techniques described herein. As shown in FIG. 2, the controller/processor 480 of the UE 120*a* has a sidelink manager 481 that may be configured for transmitting a sidelink communication to another UE. Although shown at the controller/processor 480 and controller/processor 440, other components of the UE 120*a* and BS 110*a* may be used performing the operations described herein. The memories 442 and 482 may store data and program codes for BS 110*a* and UE 120*a*, respectively. A scheduler 444 may schedule UEs for data transmission on the downlink, sidelink, and/or uplink.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 1) to another subordinate entity (e.g., UE 2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks (WLANs), which typically use an unlicensed spectrum).

Figure 5:
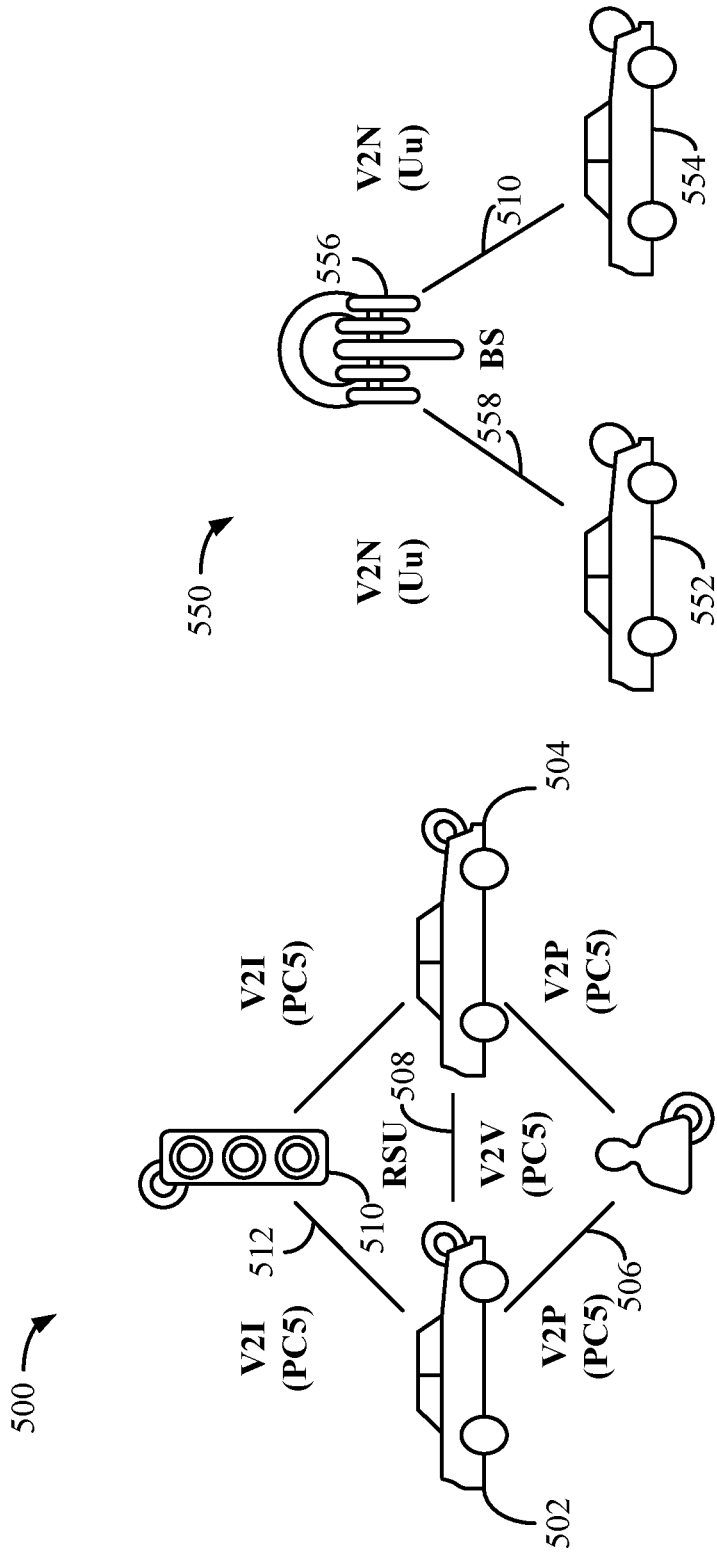
FIGS. 5A and 5B show diagrammatic representations of example vehicle to everything (V2X) systems in accordance with some aspects of the present disclosure.

FIGS. 5A and 5B show diagrammatic representations of example vehicle to everything (V2X) systems in accordance with some aspects of the present disclosure. For example, the vehicles shown in FIGS. 5A and 5B may communicate via sidelink channels and may perform sidelink CSI reporting as described herein.

The V2X systems, provided in FIGS. 5A and 5B provide two complementary transmission modes. A first transmission mode, shown by way of example in FIG. 5A, involves direct communications (for example, also referred to as side link communications) between participants in proximity to one another in a local area. A second transmission mode, shown by way of example in FIG. 5B, involves network communications through a network, which may be implemented over a Uu interface (for example, a wireless communication interface between a radio access network (RAN) and a UE).

Referring to FIG. 5A, a V2X system 500 (for example, including vehicle-to-vehicle (V2V) communications) is illustrated with two vehicles 502, 504. The first transmission mode allows for direct communication between different participants in a given geographic location. As illustrated, a vehicle can have a wireless communication link 506 with an individual (i.e., vehicle to person (V2P), for example, via a UE) through a PC5 interface. Communications between the vehicles 502 and 504 may also occur through a PC5 interface 508. In a like manner, communication may occur from a vehicle 502 to other highway components (for example, roadside service unit 510), such as a traffic signal or sign (i.e., vehicle to infrastructure (V2I)) through a PC5 interface 512. With respect to each communication link illustrated in FIG. 5A, two-way communication may take place between elements, therefore each element may be a transmitter and a receiver of information. The V2X system 500 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5B shows a V2X system 550 for communication between a vehicle 552 and a vehicle 554 through a network entity 556. These network communications may occur through discrete nodes, such as a base station (for example, an eNB or gNB), that sends and receives information to and from (for example, relays information between) vehicles 552, 554. The network communications through vehicle to network (V2N) links 558 and 510 may be used, for example, for long-range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. When a UE is transmitting a sidelink communication on a sub-channel of a frequency band, the UE is typically unable to receive another communication (e.g., another sidelink communication from another UE) in the frequency band. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications.

Generally, a sidelink may refer to a direct link between one subordinate entity (for example, UE 1) and another subordinate entity (for example, UE 2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

PSFCH may carry feedback such as channel state information (CSI) related to a sidelink channel quality. A sequence-based PSFCH format with one symbol (not including AGC training period) may be supported. The following formats may be possible: a PSFCH format based on PUCCH format 2 and a PSFCH format spanning all available symbols for sidelink in a slot.

Figure 6:
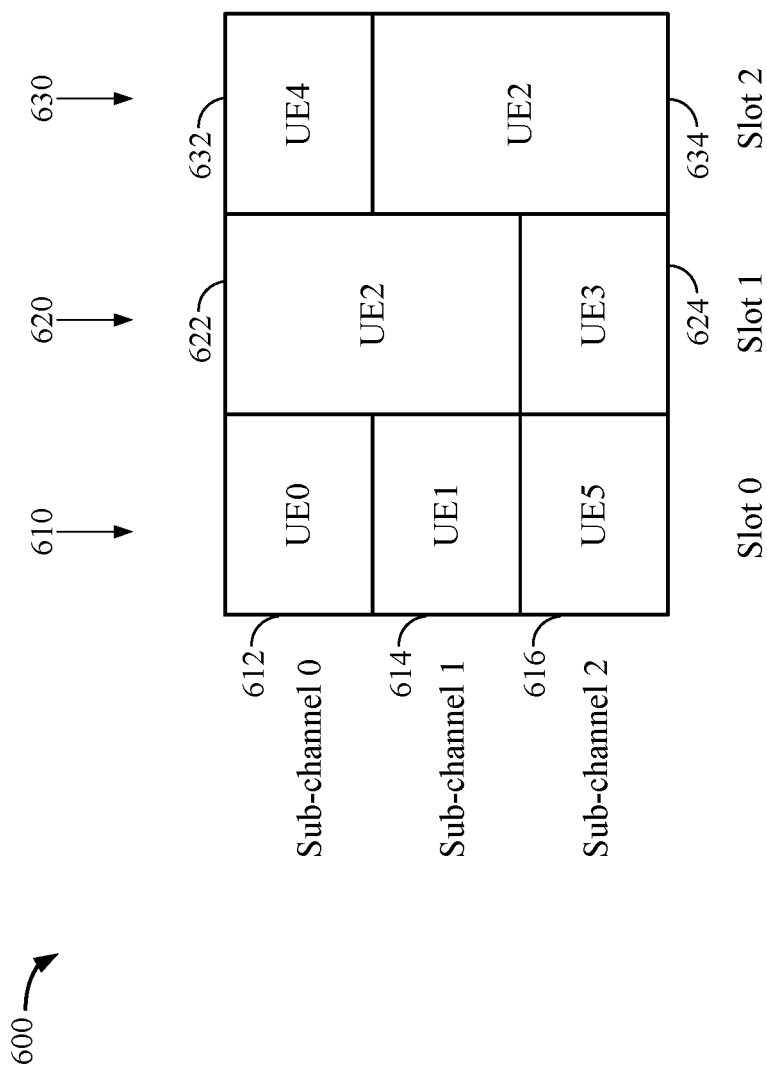
FIG. 6 illustrates an example allocation of a resource pool for sidelink communications, in accordance with certain aspects of the present disclosure.

FIG. 6 is an example of how resources of a common resource pool 600 may be allocated for sidelink communications (broadcast and groupcast device-to-device or D2D) between UEs (e.g., UEs 110 shown in FIG. 1). The common resource pool 600 includes slots 610, 620, and 630 (also referred to as slots 0, 1, and 2). As noted above, with reference to FIGS. 5A and 5B, sidelink generally refers to the link between two users, or user-relays can be used in different scenarios and for different applications. As previously described, when a UE is transmitting a sidelink communication on a sub-channel of a frequency band, the UE is typically unable to receive another communication (e.g., another sidelink communication from another UE) in the frequency band. Thus, sidelink communications may be referred to as being half-duplex. As a result, the UEs 0, 1, and 5, which transmit sidelink communications 612, 614, and 616 respectively, cannot receive the sidelink communications from each other. That is, UE 0 cannot receive the sidelink transmissions 614 and 616. Similarly, UE 2 cannot receive the sidelink transmissions 624 and 632 from UEs 3 and 4, respectively. Also, UE 3 cannot receive sidelink transmission 622 from UE 2, and UE 4 cannot receive the sidelink transmission 634 from UE 2. In aspects of the present disclosure, a sidelink transmission(s) that cannot be received may be referred to as being "erased" for the UE or wireless node that cannot receive the sidelink transmission, because the UE has no information regarding that sidelink transmission. This is unlike other situations in which a UE fails to decode a transmission, because in those situations, the UE may retain some information regarding the transmission that the UE failed to decode, and the UE may combine that retained information with a retransmission that the UE receives to determine the transmission that the UE failed to decode.

According to previously known techniques, resource allocation is reservation based in NR sidelink communications. In these techniques, resource allocations are made in units of sub-channels in the frequency domain and are limited to one slot in the time domain. In the previously known techniques, a transmission may reserve resources in the current slot and in up to two future slots. Reservation information may be carried in sidelink control information (SCI). In the previously known techniques, sidelink control information (SCI) may be transmitted in two stages. A first stage SCI (SCI-1) may be transmitted on a physical sidelink control channel (PSCCH) and contains resource reservation information as well as information needed to decode a second stage SCI (SCI-2). A SCI-2 may be transmitted on the physical sidelink shared channel (PSSCH) and contains information needed to decode data on the shared channel (SCH) and to provide feedback (e.g., acknowledgments (ACKs) or negative acknowledgments (NAKs)) over the physical sidelink feedback channel (PSFCH).

Example General Sidelink Control Operations

Aspects of the present disclosure provide techniques that help reducing transmission overhead related to sidelink control information (SCI). For example, when a transmitter UE has established a sidelink communication with a receiver UE, the transmitter UE may schedule with at least one semi-persistent scheduling (SPS) process at a first time interval. The transmitter UE may sense whether a resource is available for transmissions to the receiver UE based on decoding an SCI (or one or more SCI messages), such as an SCI 0-1 message. The SCI is transmitted at a second time interval that is greater than the first time interval. For example, the second time interval may be a multiple of the first time interval of the at least one SPS process.

As will be described in greater detail below, in some cases, the second time interval is at least twice as long as the first time interval of the at least one SPS process such that at least one SCI is skipped in one of the at least one SPS process. For example, a physical sidelink shared channel (PSSCH) codeword may be extended to use the symbols previously occupied by the skipped SCI for improving reliability of SPS transmissions. In some cases, the transmitter UE may schedule with two or more SPS processes at different time intervals. The SCI of the two or more SPS processes share the same time resources. The transmitter UE may configure the second time interval such that each of the different time intervals and the second time interval share 1 as an only common divisor, and a multiplication of each of the different time intervals and the second time interval equals to or is less than a sensing time window of the transmitter UE.

Figure 7:
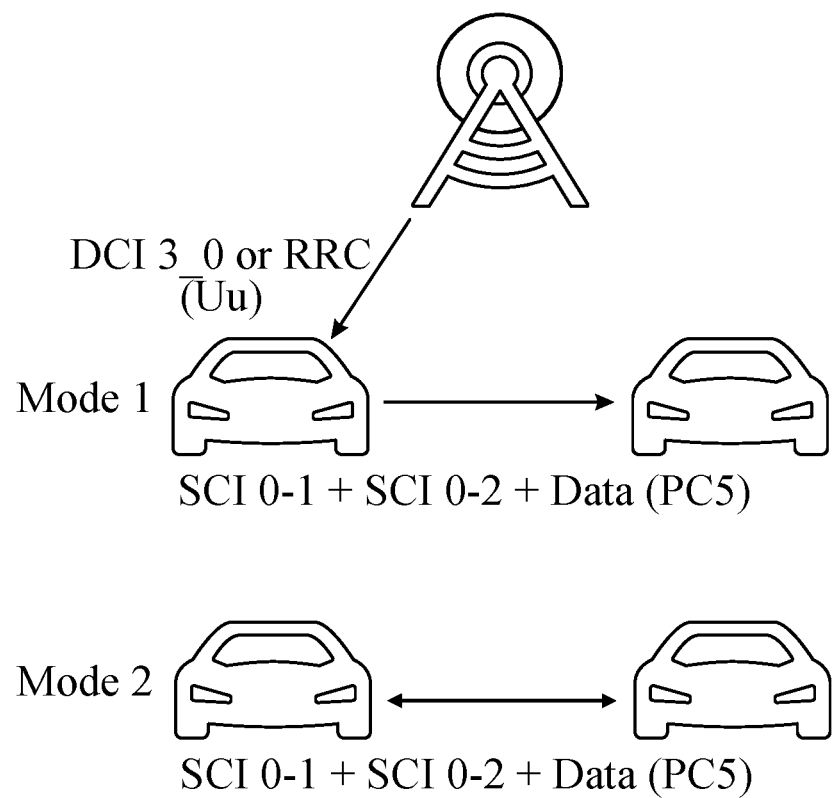
FIG. 7 illustrates two modes of sidelink communication.

FIG. 7 illustrates two modes of sidelink communications (Mode 1 and Mode 2), which may be applicable to the sidelink communications between PLCs and S/As. In Mode 1, the sidelink resources are often scheduled by a gNB (e.g., via Uu interface as shown, by DCI 3_0 or RRC). In Mode 2, the UEs may autonomously select sidelink resources from a (pre)configured sidelink resource pool(s) based on the channel sensing mechanism (e.g., via PC5 interface as shown, by SCI 0-1 and/or 0-2). When at least one UE is in-coverage, a gNB may be configured to adopt Mode 1 or Mode 2. When the UEs are out of coverage, only Mode 2 may be adopted.

Figure 8:
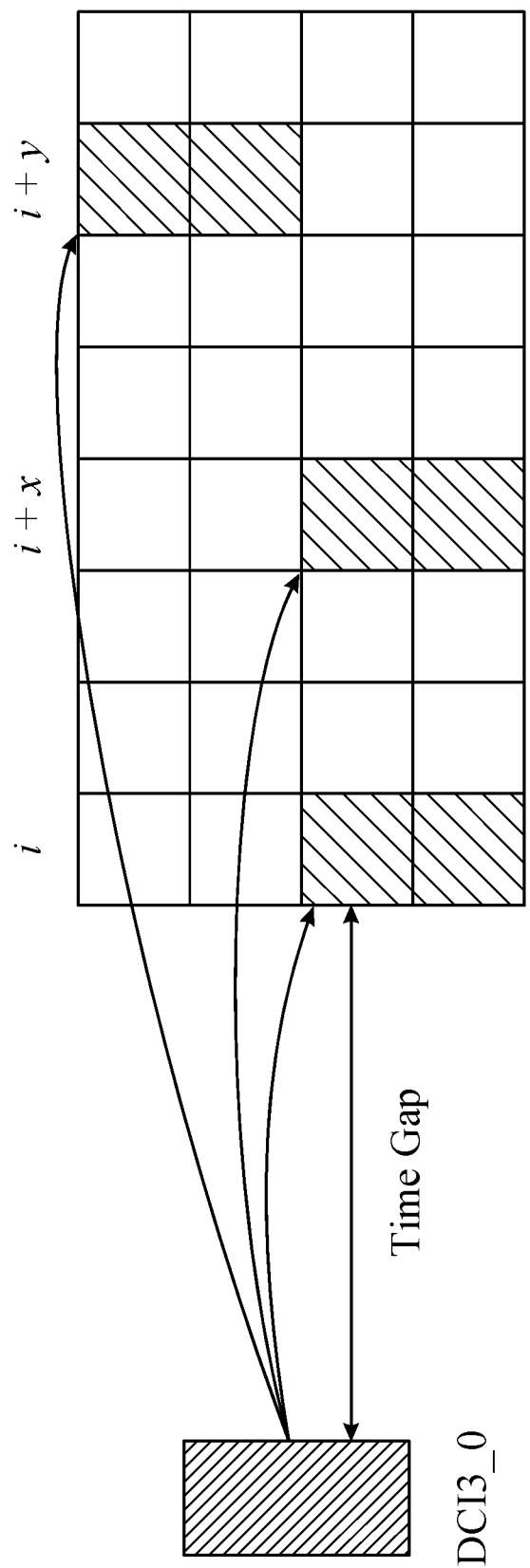
FIG. 8 illustrates an example of sidelink configuration by downlink control information (DCI), in accordance with certain aspects of the present disclosure.

In Mode 1, the gNB schedules sidelink resource(s) to be used by UE for sidelink transmission(s), for example, via dynamic grants (DG), type 1 configured grants (CG) type 1, and/or type w CGs. CG type 1 is activated via radio resource control (RRC) signaling from gNB. DG and CG type 2 are conveyed using downlink control information (DCI) format 3_0 over physical downlink control channel (PDCCH), as shown in FIG. 8.

In some aspects, the DCI can be a DG and provide allocation to use over sidelink. The DCI can activate/deactivate a CG type 2 for sidelink. The UE reports activation/deactivation confirmation using MAC-CE. For example, the DCI format 3_0 may be used for scheduling of NR PSCCH and PSSCH in one cell. The DCI format 3_0 may include the following information: time gap, HARQ process ID, new data indicator, a lowest index of the subchannel allocation to the initial transmission.

In Mode 2, when traffic arrives at a transmitter UE, the transmitter UE may select resources for PSCCH and PSSCH, and/or reserve resources for retransmissions to minimize latency. Therefore, in conventional configurations the transmitter UE would select resources for PSSCH associated with PSCCH for initial transmission and blind retransmissions, which incurs unnecessary resources and the related power consumption. To avoid such resource waste and other similar resource duplication/blind reservation/redundancy, the UEs in sidelink communication may communicate to use a subset of the resources.

For example, in Mode 2, the UE may determine, (i.e., not scheduled by the gNB) sidelink transmission resource(s) within the sidelink resources configured by the gNB/network (or pre-configured sidelink resources). In some cases, the transmitter UE may send PSCCH and PSSCH to the receiver UE. The receiver UE responds by sending sidelink feedback PSFCH to the transmitter UE. In aspects, the transmitter UE senses and selects resources based on SCI 0-1 messages and the reference signal received power (RSRP) measurements of demodulation reference signal (DMRS) inside PSSCH or PSCCH. In some examples, the transmitter UE may use SCI 0-1 or SCI 0-2 to schedule and transmit data through PSSCH.

According to the present disclosure, the PLCs and S/As, as UEs, may operate in either Mode 1 or Mode 2, with PLCs benefiting more in Mode 1 than S/As, and S/As benefiting more in Mode 2 than PLCs. The assisting node therebetween may improve reliability in both modes. In particular, the assisting node improves sidelink reliability by providing sidelink repeating operations in Mode 2.

FIG. 8 illustrates an example of sidelink configuration by downlink control information (DCI), in accordance with certain aspects of the present disclosure. The DCI format 3_0 may be transmitted from a gNB to a UE in range of the gNB. The DCI 3_0 may configure the in-range UE to establish sidelink communications with an out-of-range UE. The DCI 3_0 may include a time gap (e.g., 3 bits by sl-DCI-ToSL-Trans), a HARQ process ID (e.g., 4 bits), a new data indicator (NDI), a lowest index of the sub-channel allocation to the initial transmission, and other information, such as sidelink control information (SCI) format fields that indicate time domain or frequency domain resource allocations, physical sidelink feedback channel (PSFCH) to HARQ feedback timing indicator (sl-PSFCH-ToPUCCH), configuration index or configured grant index, etc. As shown, the DCI may use resources in slot i, i+x, and i+y to activate or release grants (e.g., configured grants).

Figure 9A:
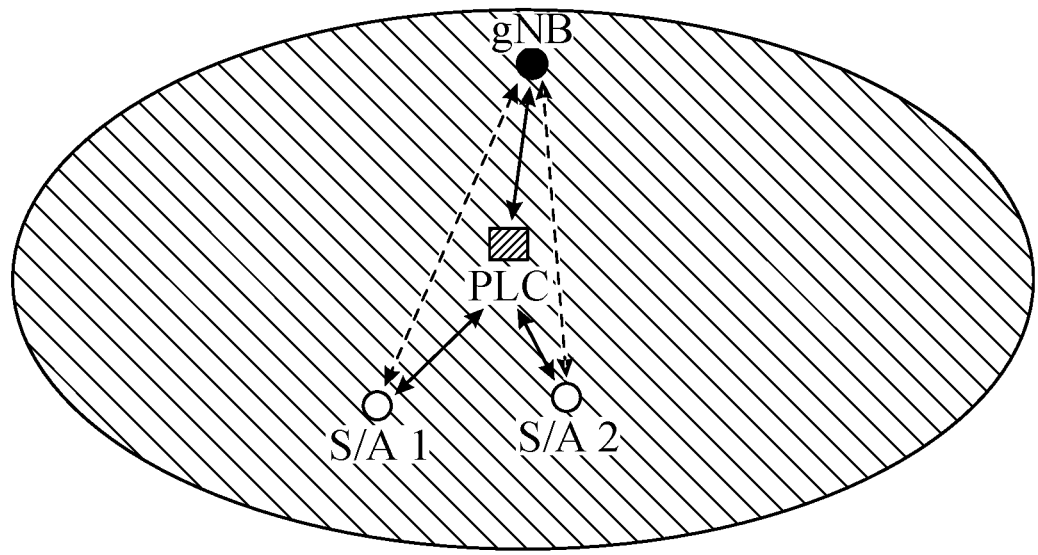
FIGS. 9A and 9B illustrate an example network that includes programmable logic controllers (PLCs) and sensors and/or actuators (S/As), in accordance with certain aspects of the present disclosure.

FIG. 9A illustrates an example connection configuration of a controller (such as a programmable logic controller, "PLC") and two or more sensors/actuators (S/As), in accordance with certain aspects of the present disclosure. Both the PLC and the S/A may generally be referred to as UE in this disclosure. Other industrial internet-of-things (IIoT) devices may be in the places of the PLC and S/A. In some cases, when the PLC transmits to an actuator, the PLC may be referred to as the transmitter UE or a first UE, and the S/A may be referred to as the receiver UE or a second UE. In some cases, when the PLC receives transmissions from a sensor, the PLC may be referred to as the receiver UE or a second UE, and the S/A may be referred to as the transmitter UE or a first UE. The designation of the transmitter UE and the receiver UE (or the first UE and the second UE) thus depends on specific operations or circumstances, and is not bound to a device as a permanent or constant attribute. As shown, the PLC may communicate with the gNB through a respective Uu-interface and may communicate with S/A1 and S/A2 through sidelink (PC5) interfaces. In some cases, the gNB are ceiling-mounted while the PLCs are located close to machinery in which the S/As are installed. In one beneficial aspect, such wireless connectivity of the PLC and S/As may significantly reduce reconfiguration costs and time on factory floor.

Figure 9B:
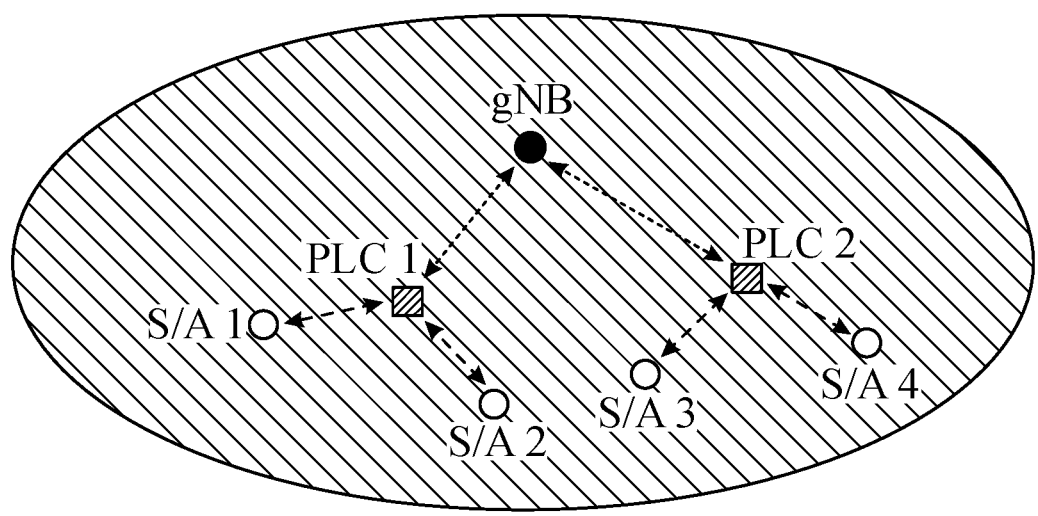

FIG. 9B illustrates an example connection configuration of a gNB in communication with two PLCs (PLC1 and PLC2) and multiple S/As, in accordance with aspects of the present disclosure. As shown, the number of PLCs and S/As may be scaled up as needed. For example, in an industrial setting, a gNB may be in communication with tens or hundreds of PLCs, each of which may manage or handle hundreds of S/As. These IIoTs may support URLLC traffic with low latencies (e.g., 1 ms) and low error rates (e.g., 1E−6 BLER). The packet size may be small (e.g., a few bytes). The traffic may be periodic and deterministic. Therefore, direct sidelink communications may satisfy most requirements in such settings. Different deployment architectures may be implemented. For example, as shown, when the gNB does not directly control the S/As, the gNB primarily communicate with the PLCs that are more capable than the S/As, e.g., the PLCs may have local scheduling capabilities for managing multiple S/As. On the other hand, the gNB may also completely control both the PLCs and the S/As and treat them as a same type of node. In some cases, the PLC and S/A deployment may be without participation of the gNB and rely on Mode 2 sidelink operations.

Figure 10A:
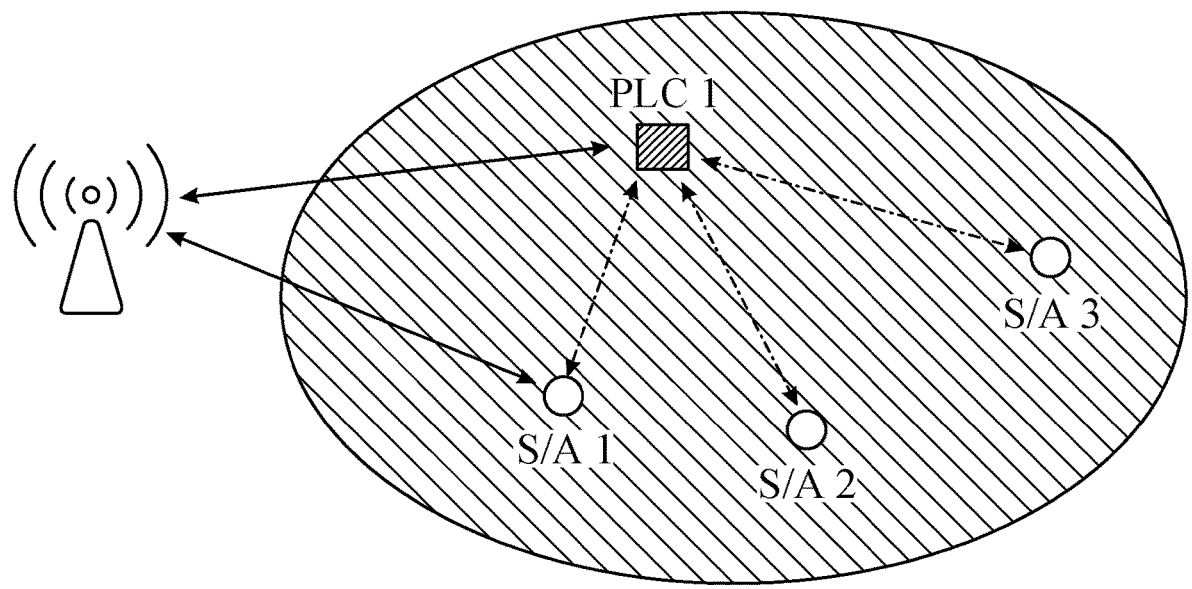
FIGS. 10A and 10B illustrate an example network that includes PLCs and S/As with an assisting node for repeating sidelink communications, in accordance with certain aspects of the present disclosure.
Figure 10B:
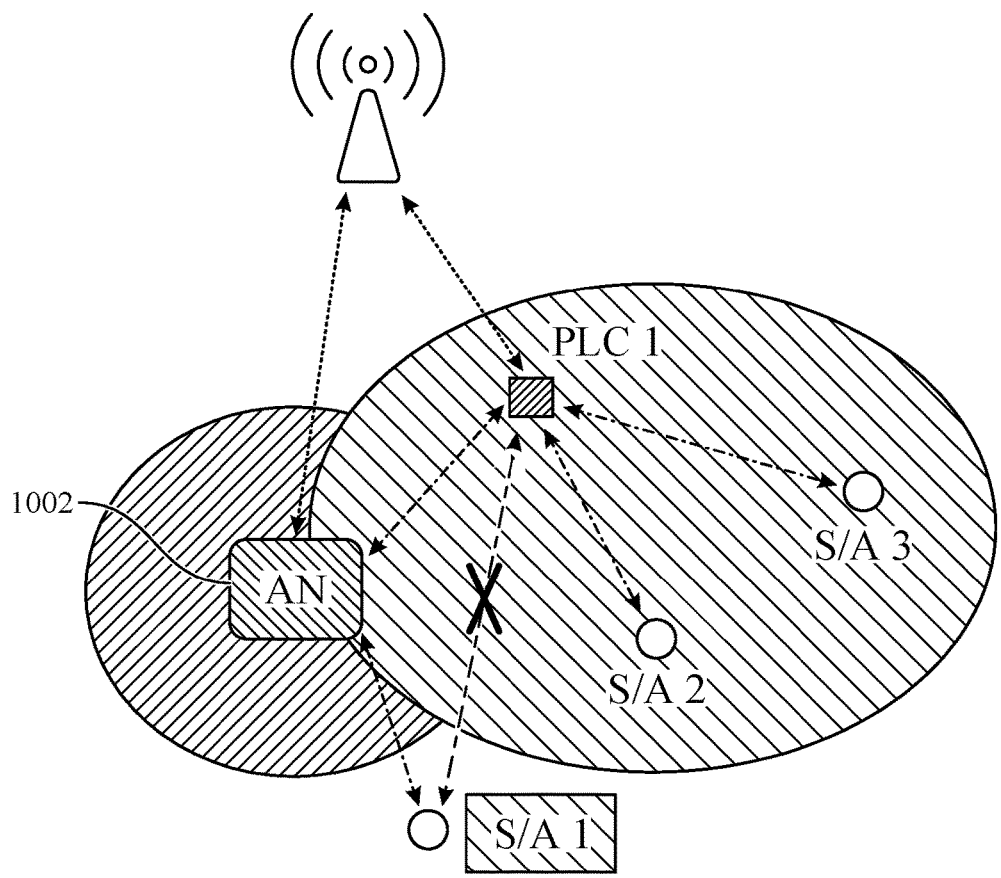

FIGS. 10A and 10B illustrate an example network that includes PLCs and S/As with an assisting node for repeating sidelink communications, in accordance with certain aspects of the present disclosure. Referring first to FIG. 10A, one or more gNB may directly communicate, via Uu interfaces, with the PLC1 and S/A1. Such connection may provide an alternative route if the sidelink between the PLC1 and S/A1 becomes unavailable. In some cases, multiple-TRP deployment with a large number of IIoT devices (such as PLC1 and S/A1) may incur high cost for achieving ultra-reliability. In addition, the direct Uu paths may be blocked by obstacles when the PLC1 and S/A1 move. Such direct connection may also face high latency issues due to two-hop. As such, the configuration shown in FIG. 10A may face several challenges, including sidelink reliability, prohibitively costly or impractical sizes of multi-TRP capability at PLC or SAs, and the likelihood of sidelink blockage due to low elevation and dense clutter deployment. To overcome these challenges, as shown in FIG. 10B, an assisting node with PC5 capability for sidelink repeating operations may be implemented to provide a cost-effective and robust solution.

As shown, FIG. 10B, an assisting node 1002 ("AN" as shown) may provide sidelink repeating operations for IIoT devices. The assisting node, or sidelink repeater, may be a smart repeater or reflector for enhancing sidelink reliability between sidelink UEs, such as PLC1 and S/A1 as shown. In some cases, the assisting node may also provide Uu coverage between the gNB and PLC1 or S/A1. For sidelink repeating operations, the assisting node may be activated on the sidelink band (e.g., used by the PLC1 and S/A1). When activated, the assisting node communicates with the PLC1 and S/.A1 in sidelinks, thus ensuring a low latency.

In some cases, the assisting node may be controlled by the gNB or PLC1 for interference management. As further discussed below, different options may be implemented to provide various control or signaling granularity for the repeating operation by the assisting node in Mode 1. For example, the assisting node may be configured or signaled in terms of sidelink slots, sidelink resource pool, sidelink operations assignment (e.g., initial transmission or retransmission when activated). The present disclosure provides different techniques for the assisting node to repeat sidelink communications among UEs.

Example Sidelink Control Operations with Assisting Nodes

Figure 11:
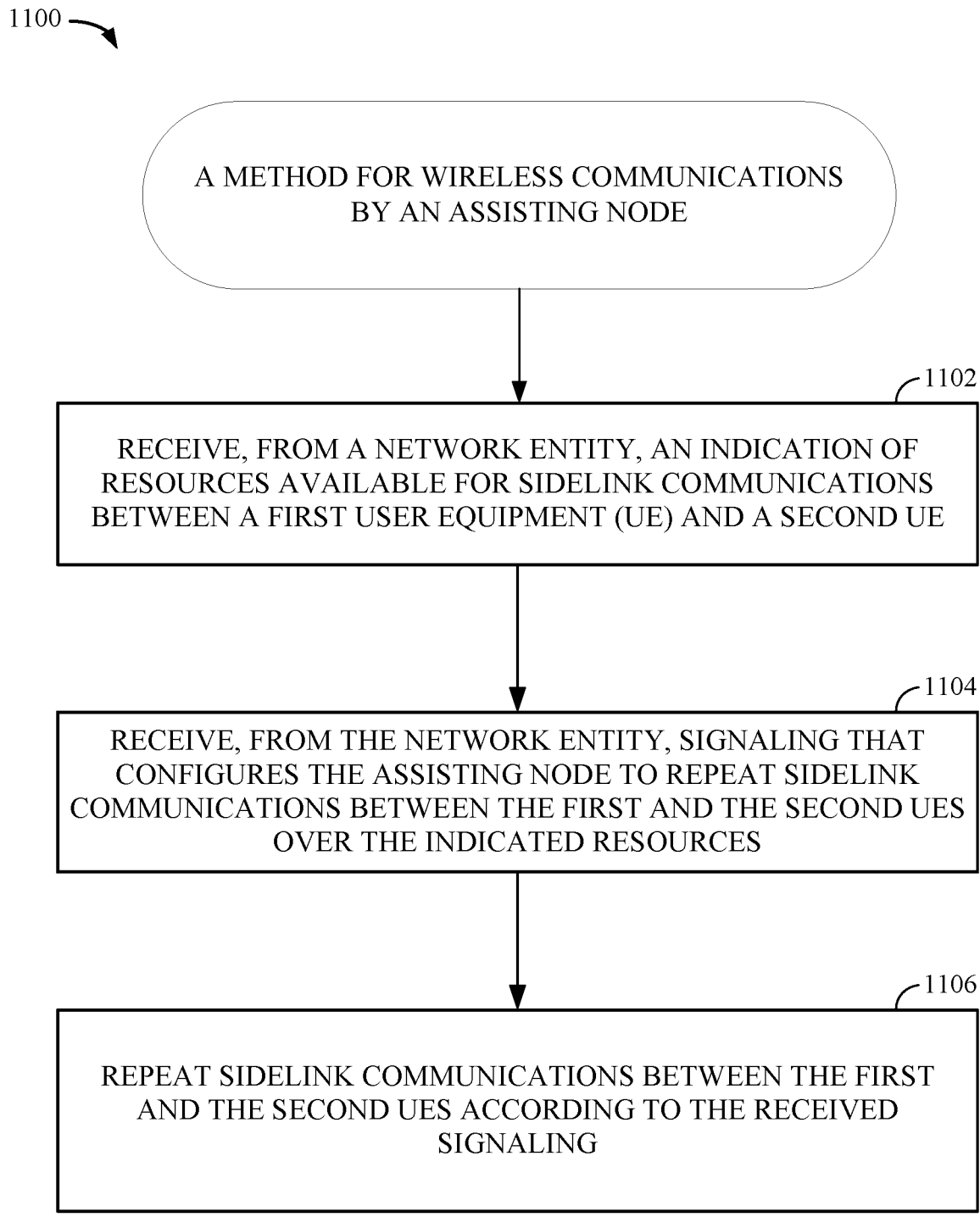
FIG. 11 illustrates example operations for wireless communications by an assisting node, in accordance with certain aspects of the present disclosure.

FIG. 11 illustrates example operations 1100 for wireless communications by an assisting node, in accordance with certain aspects of the present disclosure. For example, operations 1100 may be performed by the repeater 104 or 490 of FIG. 1 or FIG. 4.

Operations 1100 begin, at 1102, by receiving, from a network entity, an indication of resources available for sidelink communications between a first UE and a second UE. For example, the assisting node may provide sidelink retransmission or repeating operations to improve the reliability of the sidelink communication between two UEs, such as a PLC and an S/A. The sidelink communication may be any device-to-device communications when two UEs have been configured or are in the process of being configured for the sidelink communication.

At 1104, the assisting node receives, from the network entity, signaling that configures the assisting node to repeat sidelink communications between the first and the second UEs over the indicated resources. For example, the configuration may include activating or deactivating the assisting node for the sidelink repeating operations. In some cases, the network entity may provide various signaling granularity for the repeating operation in Mode 1, such as by specifying sidelink slots, resource pool, assignment, etc. At 1106, the assisting node repeats sidelink communications between the first and the second UEs according to the received signaling.

In some cases, the assisting node may receive the indication of resources available from the network entity, while also receive the signaling that configures the assisting node to be off or in a sleeping or power-saving mode. The signaling that configures the assisting node may include a switching operation depending on whether the network entity determines to involve the assisting node. In some cases, the signaling may include configuration for the assisting node to participate directly in sidelink communications (e.g., sidelink repeating operations) without further input from the gNB.

Figure 12:
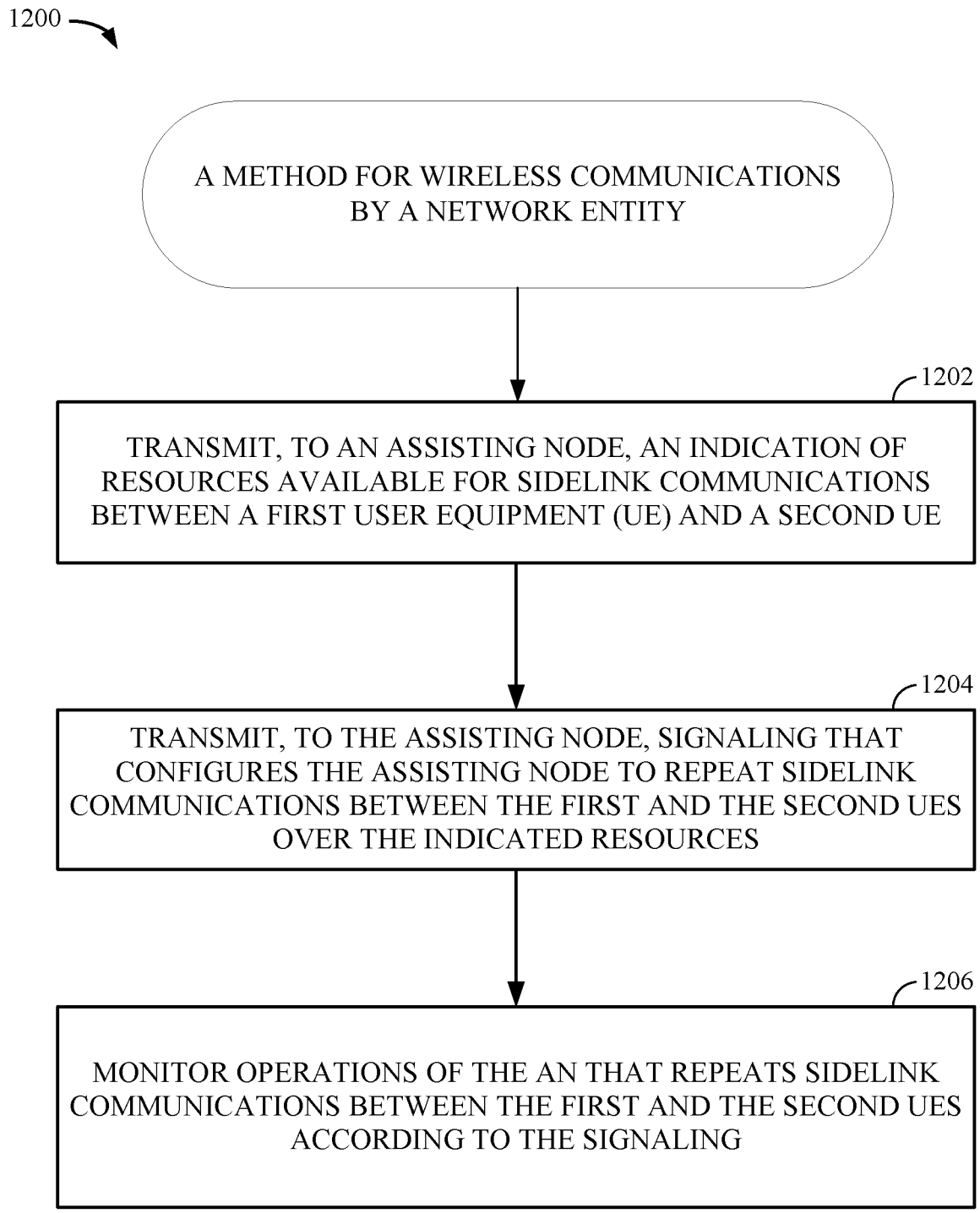
FIG. 12 illustrates example operations for wireless communications by a network entity, in accordance with certain aspects of the present disclosure.

FIG. 12 illustrates example operations 1200 for wireless communications by a network entity, in accordance with certain aspects of the present disclosure. For example, operations 1200 may be performed by the BS 110 of FIG. 1 or FIG. 4.

Operations 1200 begin, at 1202, by transmitting, to an assisting node, an indication of resources available for sidelink communications between a first UE and a second UE. At 1204, the network entity transmits, to the assisting node, signaling that configures the assisting node to repeat sidelink communications between the first and the second UEs over the indicated resources. At 1206, the network entity monitors operations of the assisting node that repeats sidelink communications between the first and the second UEs according to the signaling. For example, the network entity may receive feedback from the assisting node or one of the sidelink UEs about the sidelink repeating operations (e.g., the assisting node being on, off, scheduled sidelink instants, or having failures). In some cases, based on the monitoring, the network may assign different sidelink UEs (in place of or in addition to the first or the second UEs) to the assisting node for performing sidelink repeating operations.

FIG. 13 illustrates example operations 1300 for wireless communications by a UE, in accordance with certain aspects of the present disclosure. For example, operations 1300 may be performed by a UE 120 (e.g., 120a or 120s) of FIG. 1 or FIG. 4 when performing sidelink communications with another UE.

Operations 1300 begin, at 1302, by transmitting, to an assisting node, an initial sidelink transmission beamformed from the first UE toward the assisting node, the initial sidelink transmission repeated by the assisting node to a second UE. At 1304, the UE receives, from the assisting node, sidelink transmissions repeated by the assisting node and from the second UE in response to the initial sidelink transmission. Operations 1100, 1200, and 1300 may include the following general aspects.

According to aspects of the present disclosure, the assisting node may report to the network entity a capability of the assisting node on participating in at least one of a Uu interface or a sidelink (PC5) interface in association with one of the first or the second UE. For example, the assisting node may include multiple antennas to have beamforming directed to the network entity or the sidelink UEs. When the assisting node has a capability to participate in the Uu interface only, and reports its capability to the network entity, the network entity may configure the assisting node to passively reflect (e.g., change beam directions) beams between the sidelink UEs (e.g., regardless of specific sidelink resources) or between the network entity and a sidelink UE. When the assisting node has a capability to participate in the PC5 interface only, the network entity may configure the assisting node to participate in Mode 2 sidelink repeating operations only. When the assisting node has the capability to participate in both the Uu and the PC5 interfaces, the assisting node may be configured to participate in both Mode 1 and Mode 2 repeating operations.

In some cases, the assisting node receives one or more sidelink resource configurations from the network entity.

The one or more sidelink resource configurations are determined based on at least one of: the capability reported from the assisting node to the network entity, a request by the assisting node for the one or more sidelink resource configurations. The one or more sidelink resource configurations may include indications of one or more sidelink slots for the assisting node to repeat the sidelink communications between the first and the second UEs. The one or more sidelink slots may include a starting slot and a duration for repeating operation.

In some cases, the network entity transmits the signaling that includes a bitmap that indicates a status on the one or more sidelink slots of the one or more sidelink resource configurations. In some cases, the assisting node transmits to the network entity the request that includes an indication of availability of the assisting node at one or more time instants, so that the network entity may determine the one or more sidelink resource configurations for the assisting node. For example, the time instants include one or more points in time that the assisting node is available to perform sidelink repeating operations. Such information allows the network entity to allocate resources differently at different time instants when the assisting node may have different availabilities.

According to aspects of the present disclosure, the indication of resources available for sidelink communications may include slots for one or more sidelink resource pools. The signaling received by the assisting node may include sidelink resource pool configurations for the one or more sidelink resource pools. In some cases, the assisting node receives, from the network entity, a downlink control information (DCI) for a sidelink grant for one of the first or the second UE. The assisting node then activates the repeating of the sidelink communications at one or more sidelink instants when one of the first or the second UE is scheduled, according to the sidelink grant, to transmit to another one of the first or the second UE. For example, repeating the sidelink communications includes relaying or reflecting the sidelink communications between the first and the second UEs.

In some cases, the assisting node may activate the repeating of the sidelink communications for sidelink slots that belong to a specific resource pool. In some cases, activating the repeating of the sidelink communications may be based on a hybrid automatic repeat request (HARQ) feedback transmitted from at least one of the first and the second UEs to the network entity. In some cases, the network entity transmits to the assisting node the signaling that includes one or more bit fields indicating the specific resource pool for activating the repeating of the sidelink communications. The signaling may also include a start time, a stop time, or a duration of the repeating. The signaling may further include a beam configuration for the assisting node to perform beamforming with at least one of the first UE or the second UE.

According to aspects of the present disclosure, the assisting node may repeat retransmissions of sidelink communications between the first and the second UEs and adjusts beam directions for reception and transmission with the first and the second UEs. For example, the assisting node may train beamforming respectively with the first UE and the second UE, such that the first UE may transmit in a specific beam direction to the assisting node. The assisting node may repeat one or both of physical sidelink control channel (PSCCH) and physical sidelink shared channel (PSSCH) retransmissions only. In some cases, the assisting node may repeat retransmissions of PSCCH, PSSCH, and physical sidelink feedback channel (PSFCH). The assisting node may vary beam widths for repeating different retransmissions (e.g., the retransmissions of PSCCH, PSSCH, and PSFCH).

According to aspects of the present disclosure, the assisting node may receive an indication of configuration of physical sidelink feedback channel (PSFCH) transmissions of the first and the second UEs; and detect PSFCH for each sidelink transmission by the first and the second UEs. The assisting node may switch on for a next scheduled sidelink retransmission upon detecting a negative acknowledgement (NACK) in the PSFCH.

According to aspects of the present disclosure, the assisting node may receive an initial sidelink transmission from one of the first and the second UEs. The initial sidelink transmission is beamformed from the one of the first and the second UEs to the assisting node. The assisting node then repeats the initial sidelink transmission to another one of the first and the second UEs.

Details of the operations 1100-1300 are further illustrated in the examples in FIGS. 14-20 below.

Figure 14:
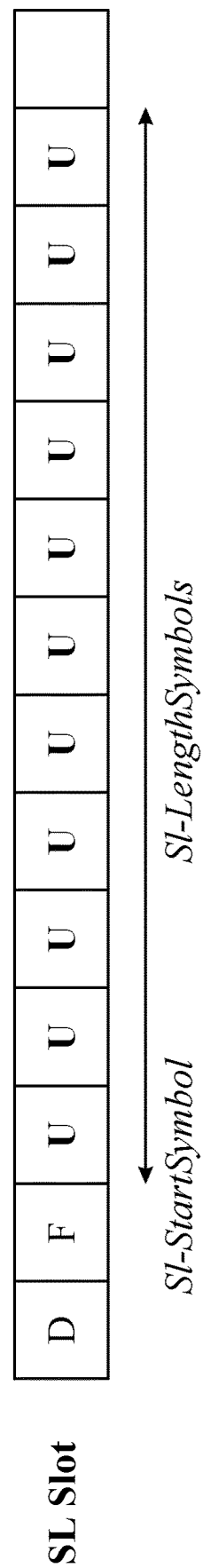
FIG. 14 illustrates an example sidelink slot, in accordance with certain aspects of the present disclosure.

FIG. 14 illustrates an example sidelink slot, in accordance with certain aspects of the present disclosure. As shown, the example sidelink slot includes a number of sidelink start symbols (sl-StartSymbol) and a number of sidelink length symbols (sl-LengthSymbols). The assisting node may report to the network entity regarding its capabilities to transmit over Uu and PC5 sidelink interfaces to be registered with the network entity. The network entity may also receive reports from other sidelink nodes and determine how to efficiently associate the assisting node (e.g., based on its report) with one or more other sidelink nodes.

In a first option, the assisting node may perform sidelink repeating operations over sidelink slots as shown in FIG. 14. The network entity may transmit sidelink resource configurations to the assisting node, such as to configure the sidelink start symbols and length symbols (e.g., sl-startSymbol, and sl-LengthSymbol). In some cases, the sidelink resource configurations may be transmitted upon the assisting node's request. In some cases, the sidelink resource configurations may be transmitted based on the assisting node's capability report regarding transmissions over Uu and/or PC5 interfaces. As shown, the sidelink repeated by the assisting node may use only semi-static "U" symbols. For example, if any symbol within a slot from sl-startSymbol to sl-startSymbol+sl-LengthSymbol is not a semi-static "U," then the slot may not be used for sidelink.

In some cases, the network entity may indicate, to one or more sidelink UEs, for example, the assisting node's repeating operations on one or more sidelink slots for enhancing sidelink reliability. The one or more sidelink slots may include the starting slot and a time duration (e.g., a total number of slots) for the repeating operation. In some cases, slots that do not belong to sidelink may be skipped by the assisting node.

In one example, the network entity may transmit a bitmap with fixed length to indicate ON/OFF on the sidelink slots, e.g., 14 bits for 14 consecutive sidelink slots. The first sidelink slot may include at least T1 slots or symbols after the last symbol of the DCI for UE to decode the DCI. The network entity may schedule the assisting node to repeat sidelink operations based on reports or suggestions from the assisting node, in case the assisting node is not available at all time instants and the network entity may determine which time period the sidelink repeating operation may be provided by that assisting node.

In a second option, the assisting node may perform sidelink repeating operations for one or more sidelink resource pools (instead of sidelink slots). The network entity may transmit sidelink resource pool configurations to the assisting node. The sidelink resource pool configurations may include time domain slots for each resource pool. For example, the sidelink resource pool may use semi-static "U" symbols. In some cases, the network entity may determine resource pool based on the time-division duplex (TDD) pattern in SIB1. The assisting node may be configured to have the information of the TDD pattern in the cell.

In some cases, the assisting node may be configured to overhear or decode a DCI 3_0 of sidelink grant for a sidelink UE. The assisting node may switch ON at one or more sidelink instants when the sidelink UE is scheduled to transmit according to the network entity's configuration.

In some cases, the network entity may activate the assisting node for sidelink repeating operations for sidelink slots that belong to a specific resource pool. For example, the network entity may identify certain sidelink transmissions that need assistant node's help based on HARQ feedback from one or more sidelink UEs (or sidelink nodes in general).

In another example, the network entity may transmit an activation command to the assisting node to initiate sidelink repeating operation in one or more of the sidelink resource pool. For example, the activation command may contain bit fields indicating the targeting sidelink resource pool.

In some cases, an activation command may additionally indicate the start time, the stop time, and/or the duration of the sidelink repeating operation. The duration time may be given in terms of logical slots within the resource pool. In this case, the sidelink repeating operation is on or activated only for slots that belong to the indicated resource pool(s). For example, the network entity may determines the duration for the sidelink repeating operation based on time domain resource allocation (TDRA) in the scheduling DCI 3_0.

In some cases, the activation command from the network entity may indicate to the assisting node a beam index for receiving and transmitting the waveform (in some cases, also transmit power). For example, the network entity knows both the sidelink transmitter UE and the sidelink receiver UE, and their respective beams to the assisting node. The network entity may directly indicate a known best transmit or receiving beam at the assisting node.

In another case, the network entity may know the sidelink transmitter UE and the receiver UE, but not the respective best beams to the assisting node. The network entity may then only indicate an ID of the sidelink receiving UE, but not the beam. The network entity may configure the assisting node to use a broad beam or allow the assisting node to select a beam to use toward the sidelink receiving UE.

In yet another case, when the network entity knows only the sidelink transmitter UE but not the sidelink receiver UE, the network entity may transmit to the assisting node the reception related beam information from the sidelink transmitter UE. Alternatively, the assisting node may use a broad beam for its transmission.

Figure 15:
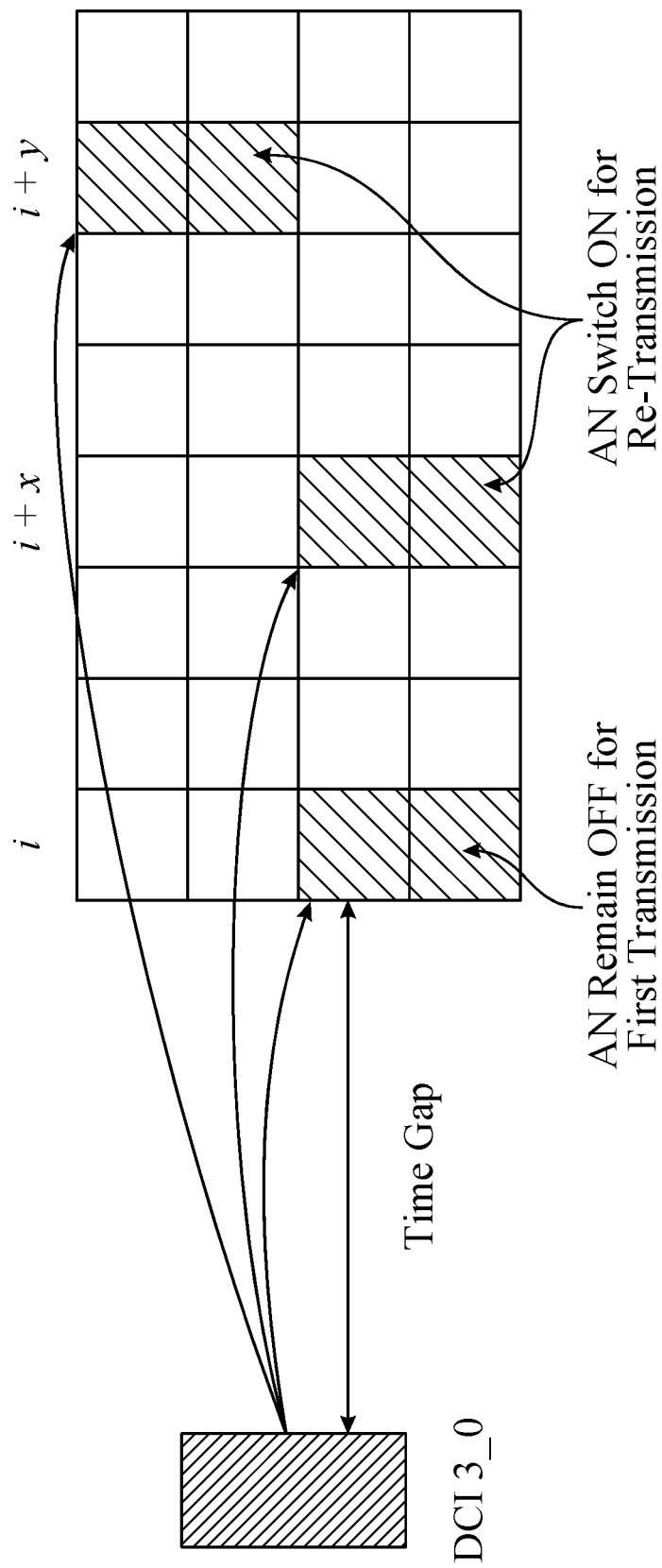
FIG. 15 illustrates an example of sidelink configuration by downlink control information (DCI), in accordance with certain aspects of the present disclosure.

FIG. 15 illustrates an example of sidelink configuration by downlink control information (DCI), in accordance with certain aspects of the present disclosure. This example corresponds to a third option for the assisting node's repeating operations that includes sidelink retransmissions only. That is, the network entity may associate the assisting node with a sidelink UE (e.g., a PLC or S/A) and have the assisting node handles sidelink retransmissions. For example, the assisting node may be configured to overhear or decode the DCI 3_0 for sidelink grand in Mode 1 for a sidelink UE. As shown, the DCI format 3_0 may indicate a beam of the assisting node toward a sidelink receiver UE. At the three indications shown, the assisting node remains off at i for the first transmission. The assisting node switches on for retransmissions at i+x. The assisting node stays on for retransmissions at i+y.

The assisting node may select a beam in three cases. In a first case, the network entity does not know about the sidelink receiver UE. In a second case, the network entity knows only an ID of the sidelink receiver UE and does not have its beam information. In a third case, the network entity knows both the ID and the beam information of the sidelink receiver UE. In all these cases, the network entity may provide the assisting node with two options. The first option is to allow the assisting node to select a beam (e.g., by beam training) to use with the sidelink receiver UE. The second option is to use a broad beam when the beam information of the sidelink receiver UE is unknown or to use an indicated beam when the beam information of the sidelink receiver UE is known.

In addition, the assisting node may be monitoring the sidelink control information (SCI) from a sidelink UE (or sidelink node) to learn about the sidelink UE's resource reservation information in Mode 2. In some cases, the SCI may indicate the assisting node's beam toward the sidelink receiver UE, e.g., the beam information may be up to the assisting node or may be an explicit beam indication.

In some cases, the network entity may configure the assisting node to repeat sidelink transmission on scheduled retransmission resources. This applies to IIoT settings because retransmission in IIoT typically requires a lower block error ratio (BLER) since data packets have to be delivered within a stringent latency bound. The network entity may allow this repeating feature only for configured grant (CG), or for both dynamic grant (DG) and CG.

In some cases, the network entity may configure a first, second and third transmit power for the assisting node's repeating for the first, second, and third granted sidelink resources. For example, such configurations may help achieving: power saving at the assisting node, reduced interference for first transmission, and repeating at higher power if a packet is close to latency bound.

Figure 16:
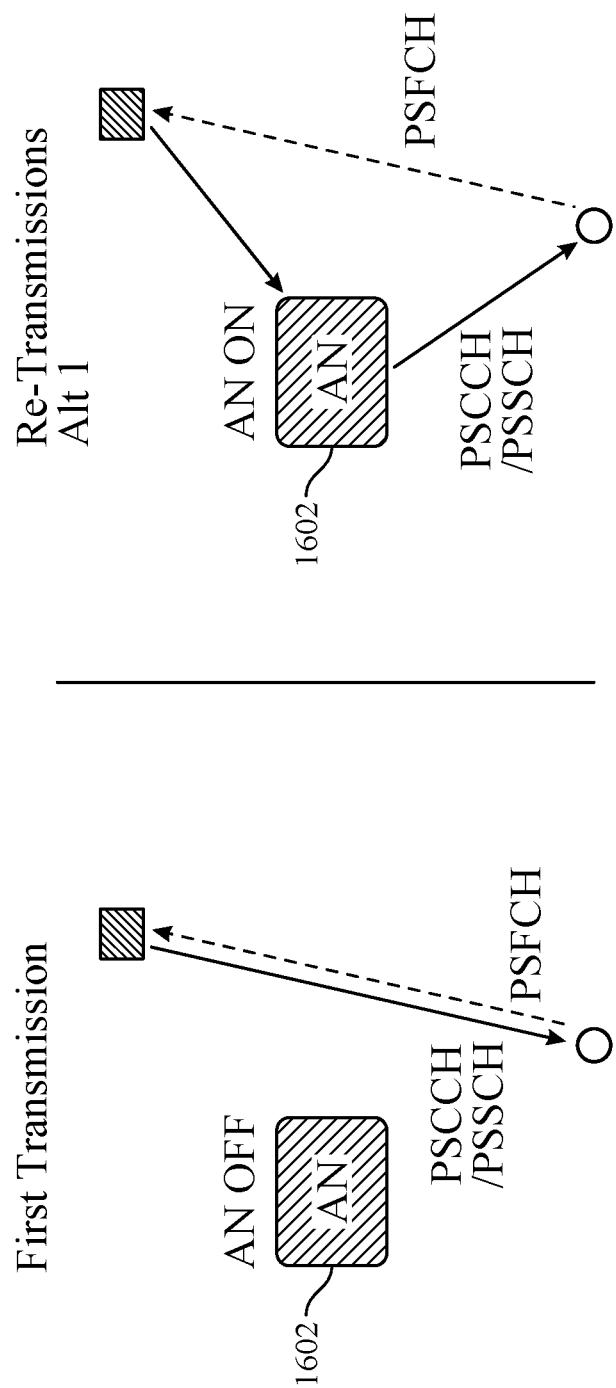
FIG. 16 illustrates an example of using an assisting node to provide sidelink retransmissions between two UEs, in accordance with certain aspects of the present disclosure.

FIG. 16 illustrates a first alternative of using an assisting node to provide sidelink retransmissions between two UEs, in accordance with certain aspects of the present disclosure. As shown, for a first transmission when the assisting node 1602 is off, a sidelink transmitter UE (e.g., a PLC) directs or steers beam of PSCCH/PSSCH transmission toward the sidelink receiver UE (e.g., an S/A). Likewise, the sidelink receiver UE steers beam of PSFCH toward the sidelink transmitter UE. The receptions beams may be configured similarly.

When the assisting node is switched on, the beam directions may be configured in two alternative situations. FIG. 16 illustrates a first alternative, where PSCCH/PSSCH beams are redirected to the assisting node and the PSFCH beam uses the original direction between the sidelink receiver UE and the sidelink transmitter UE. As shown, when the assisting node 1602 is switched on for sidelink retransmissions (including blind retransmissions where HARQ is not needed), the sidelink transmitter UE directs a beam of PSCCH or PSSCH toward the assisting node 1602, which replays the transmission to the sidelink receiver UE.

In this case, the sidelink receiver UE maintains the beam direction of PSFCH toward the sidelink transmitter UE. The assisting node directs the reception beam toward the sidelink transmitter UE and the transmit beam toward the sidelink receiver UE at retransmission sidelink slots with configured transmit power. In the illustrated example, the assisting node may remain OFF for PSFCH, while ON for PSCCH/PSSCH.

Figure 17:
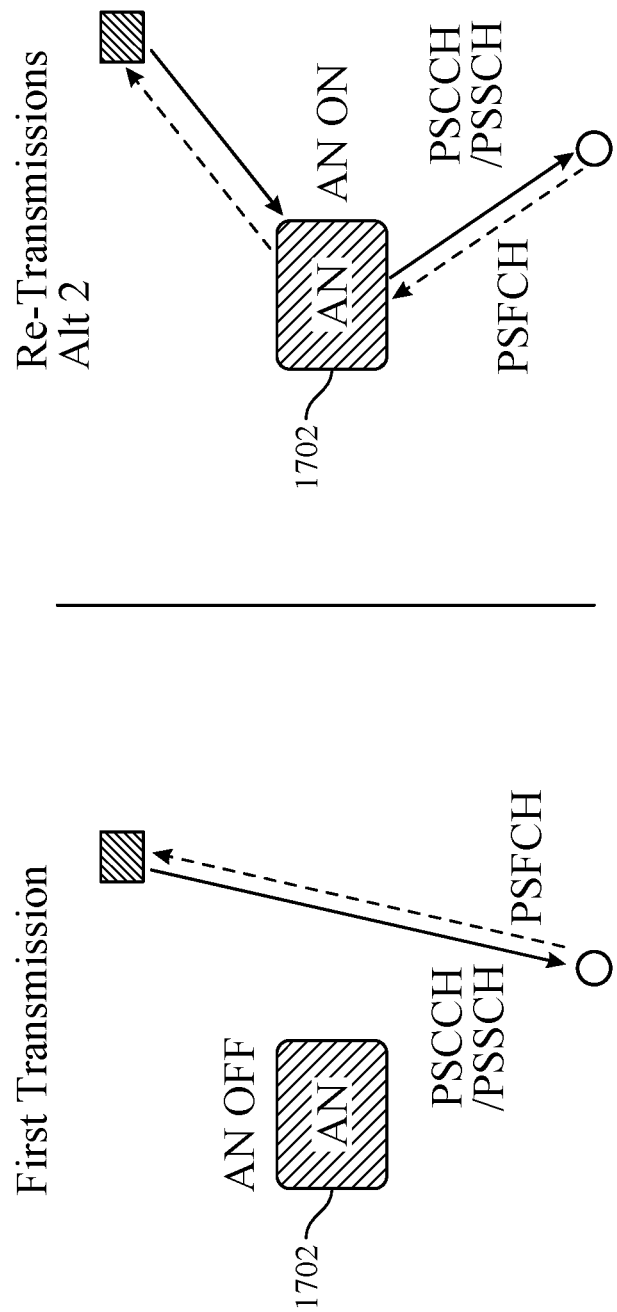
FIG. 17 illustrates an example of using an assisting node to provide sidelink retransmissions between two UEs, in accordance with certain aspects of the present disclosure.

FIG. 17 illustrates the second alternative of using an assisting node to provide sidelink retransmissions between two UEs, in accordance with certain aspects of the present disclosure. As shown, in addition to updating beamforming directions for the transmissions of PSCCH/PSSCH, the sidelink receiver UE also redirects the beam of PSFCH toward the assisting node 1702. Similarly, reception beams are also re-transmitted via the assisting node at different beam directions at the sidelink transmitter UE and the sidelink receiver UE. In other words, the assisting node remains on at retransmission occasions for both PSCCH/PSSCH and PSFCH.

Furthermore, the assisting node may be configured to use different beams for different transmissions. For example, the assisting node may first use a narrow beam for a first retransmission and switch to a broader beam for a second retransmission to avoid beam mismatch. Otherwise, using a narrow beam that could be wrong may lead to reception failure at the sidelink receiver UE—such potential error may be avoided using the subsequent broader beam. In another example, the assisting node may first use a broad beam for a first retransmission. The assisting node may then, based on a reception beam of PSFCH from the sidelink receiver UE, perform beam fine-tuning for a second retransmission.

Figure 18:
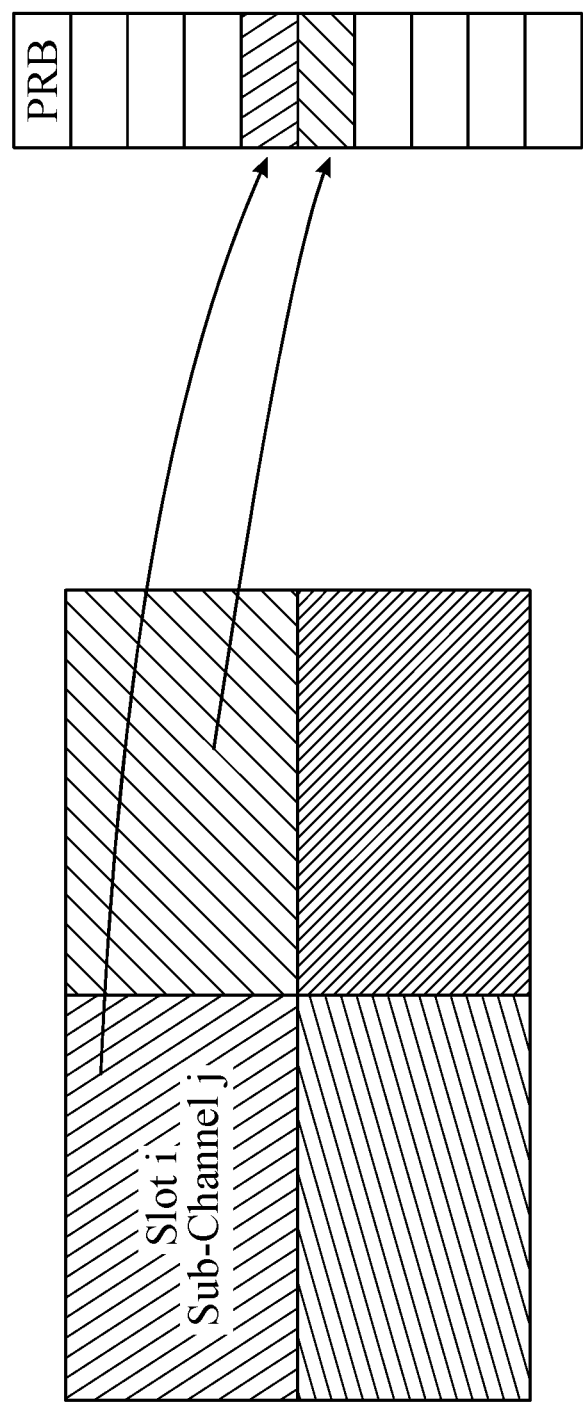
FIG. 18 illustrates an example physical resource block (PRB) configuration, in accordance with certain aspects of the present disclosure.

FIG. 18 illustrates an example physical resource block (PRB) configuration, in accordance with certain aspects of the present disclosure. This example corresponds to a fourth option of the present disclosure, where the assisting node repeats sidelink feedback between the sidelink UEs (e.g., the received NACK on PSFCH). For example, the assisting node may be provided with granted sidelink resources (DG, CG, or both) for transmissions and retransmissions of sidelink packets. The network entity may additionally provide the assisting node the configuration of PSFCH to the assisting node, e.g., periodicity, RB set, etc. The assisting node may detect PSFCH for each sidelink transmission. If NACK is detected, the assisting node may switch on for next scheduled retransmission (examples illustrated in FIG. 19).

For the assisting node to detect PSFCH ACK or NACK, the assisting node may be provided with a sidelink ID (SL-ID) of the transmitter UE (or the SL-ID of a receiver UE for groupcast, such as in the second option). The assisting node may also be informed about the PSFCH configured waveform, e.g., the supported number of cyclic shifts for PUCCH format 0 and RB selection within PSSCH subchannel, or only within subchannel with lowest index. Alternatively, the sidelink transmitter UE may relay NACK to the assisting node to activate the sidelink repeating operation on one or more retransmission occasions. In this case, the sidelink receiver UE may be configured to transmit two ACK or NACK to both the assisting node and the sidelink transmitter UE.

Figure 19:
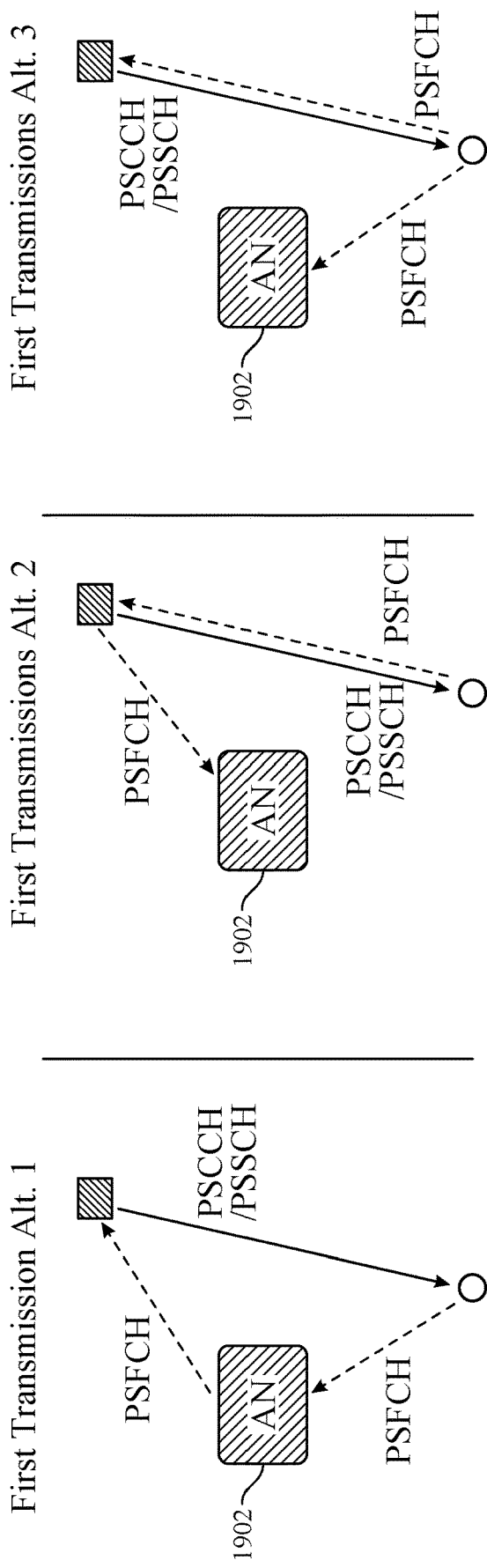
FIG. 19 illustrates examples of using an assisting node to provide sidelink retransmissions between two UEs, in accordance with certain aspects of the present disclosure.

FIG. 19 illustrates examples of using an assisting node 1902 to provide sidelink retransmissions between two UEs, in accordance with certain aspects of the present disclosure. The examples correspond to alternative examples of the fourth option where the assisting node is retransmitting sidelink feedback on PSFCH.

During the first/initial sidelink transmission, the sidelink transmitter UE directs beam of PSCCH/PSSCH toward the sidelink receiver UE and the assisting node remains OFF. The assisting node will remain OFF for PSCCH/PSSCH. However, the assisting node may relay the PSFCH to the sidelink transmitter UE so that the sidelink transmitter UE can decode PSFCH as well. The assisting node's relay may be triggered only if NACK is detected; otherwise the assisting node may not relay PSFCH to the sidelink transmitter UE (the sidelink transmitter UE may assume ACK if no PSFCH transmission from the assisting node is detected). If NAK received at the sidelink transmitter UE, the sidelink transmitter UE may initiate the assisting node for retransmission.

Upon initiation, the assisting node may behave in three alternative situations. In a first alternative, the assisting node retransmits the feedback transmission PSFCH from the sidelink receiver UE to the sidelink transmitter UE, as shown in the first alternative on the left of FIG. 19. In a second alternative (in the middle of FIG. 19), the sidelink receiver UE directs the PSFCH toward the sidelink transmitter UE, and the sidelink transmitter UE relays the PSFCH feedback to the assisting node (e.g., for retransmission activation). In a third alternative, the sidelink receiver UE transmits two PSFCH feedbacks to both the assisting node and the sidelink transmitter UE.

Figure 20:
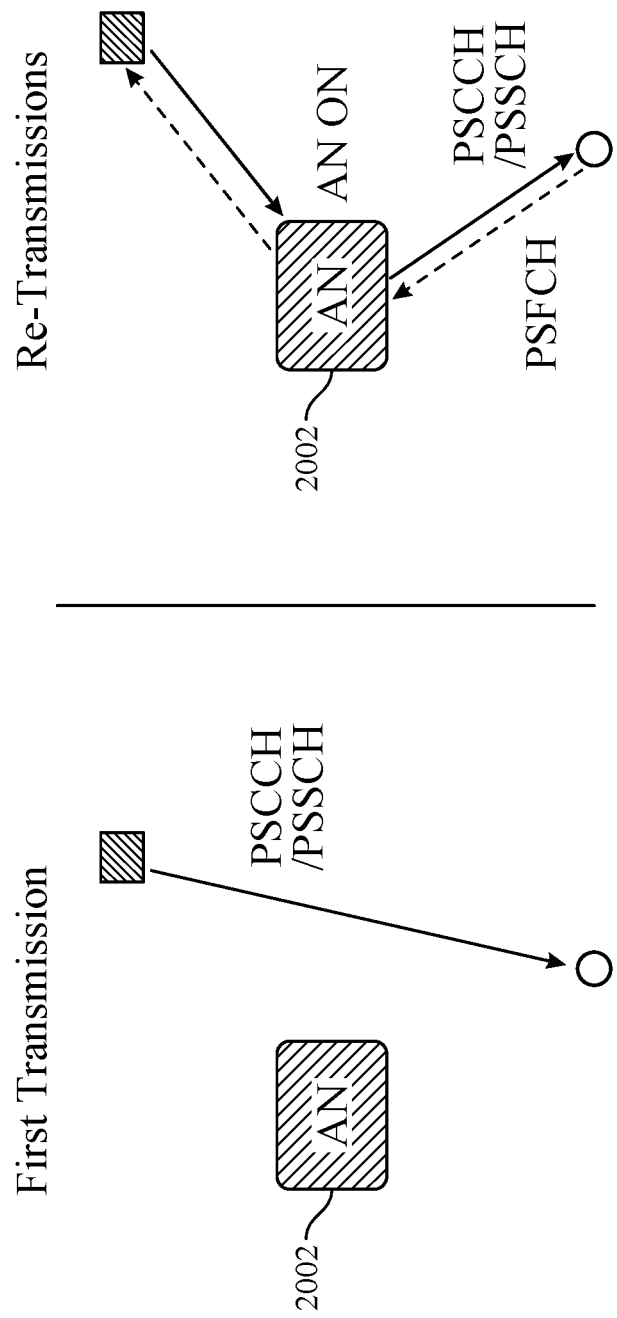
FIG. 20 illustrates examples of using an assisting node to provide sidelink retransmissions between two UEs, in accordance with certain aspects of the present disclosure.

FIG. 20 illustrates examples of using an assisting node 2002 to provide sidelink retransmissions between two UEs, in accordance with certain aspects of the present disclosure. When the assisting node receives NACK on PSFCH, the assisting node may be initiated for sidelink retransmissions. For example, if NACK is detected at the sidelink transmitter UE, the sidelink transmitter UE may direct beam of PSCCH/PSSCH for a retransmission toward the assisting node. If NACK is detected at the assisting node, the assisting node receives PSCCH/PSSCH from the sidelink transmitter UE and transmits toward the sidelink receiver UE. The detection of NACK may be similar to the examples discussed in FIG. 18. The assisting node may be configured to use different beams for different transmissions or retransmissions, e.g., using PSFCH reception from the sidelink receiver UE or the sidelink transmitter UE to fine-tuning the transmit/receive beam toward the sidelink receiver UE or transmitter UE.

In a fifth option, the assisting node may repeat the initial or first sidelink transmission between the sidelink UEs. For example, in addition to the third and fourth options above (e.g., initiating the assisting node based on sidelink feedback, often subsequent to the initial sidelink transmission), the assisting node may also be configured to repeat in the first transmission. In this case, the sidelink transmitter UE and the sidelink receiver UE beam may originally point toward the assisting node for the first sidelink transmission. This option may be useful when the two UEs know that a direct sidelink therebetween is physically impractical, or the alternative signal path provided by the assisting node is much more reliable than the direct sidelink.

Figure 21:
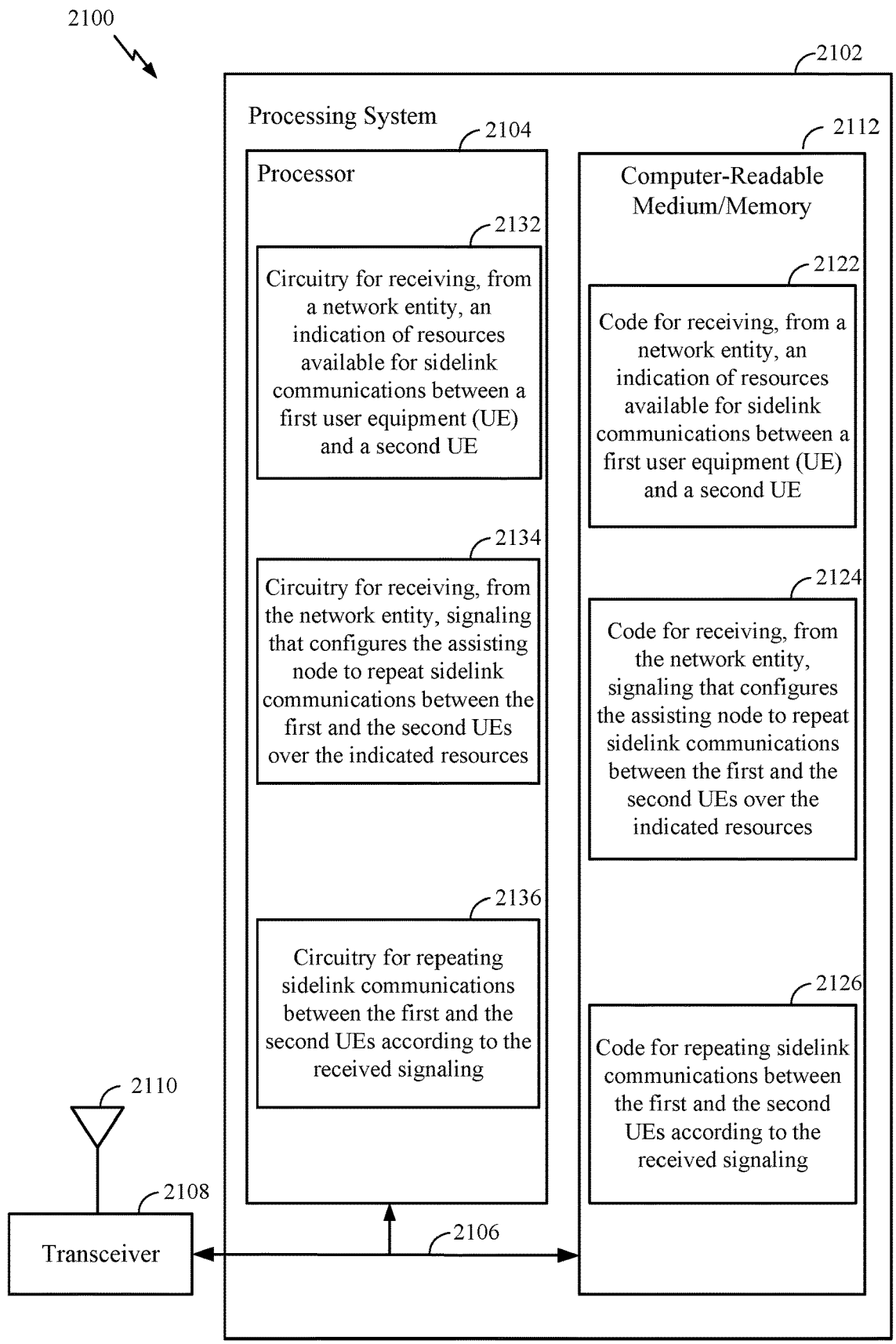
FIG. 21 illustrates a communications device that may include various components configured to perform the operations illustrated in FIG. 11, in accordance with certain aspects of the present disclosure.

FIG. 21 illustrates a communications device 2100 that may include various components (e.g., corresponding to means-plus-function components) configured to perform operations for the techniques disclosed herein, such as the operations illustrated in FIG. 11. The communications device 2100 includes a processing system 2102 coupled to a transceiver 2108. The transceiver 2108 is configured to transmit and receive signals for the communications device 2100 via an antenna 2110, such as the various signals as described herein. The processing system 2102 may be configured to perform processing functions for the communications device 2100, including processing signals received and/or to be transmitted by the communications device 2100.

The processing system 2102 includes a processor 2104 coupled to a computer-readable medium/memory 2112 via a bus 2106. In certain aspects, the computer-readable medium/ memory 2112 is configured to store instructions (e.g., computer-executable code) that when executed by the processor 2104, cause the processor 2104 to perform the operations illustrated in FIG. 11. In certain aspects, computer-readable medium/memory 2112 stores code 2122 for receiving an indication of resources available for sidelink communications between a first UE and a second UE, code 2124 for receiving, signaling that configures the assisting node to repeat sidelink communications between the first and the second UEs over the indicated resources, and code 2126 for repeating sidelink communications between the first and the second UEs according to the signaling. In certain aspects, the processor 2104 has circuitry configured to implement the code stored in the computer-readable medium/memory 2112. The processor 2104 includes circuitry 2132 for receiving an indication of resources available for sidelink communications between a first UE and a second UE, circuitry 2134 for receiving, signaling that configures the assisting node to repeat sidelink communications between the first and the second UEs over the indicated resources, and circuitry 2136 for repeating sidelink communications between the first and the second UEs according to the signaling.

Figure 22:
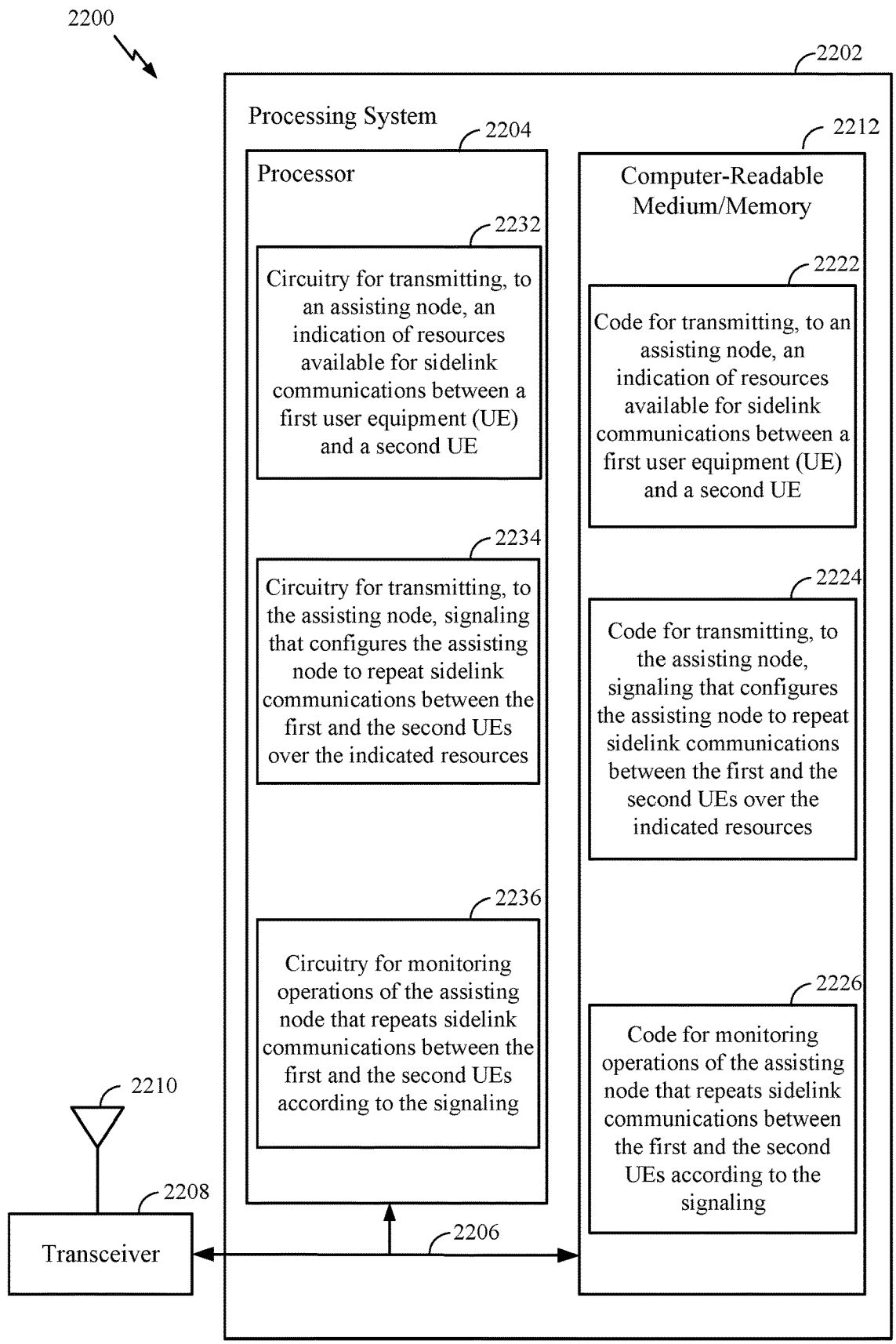
FIG. 22 illustrates a communications device that may include various components configured to perform the operations illustrated in FIG. 12, in accordance with certain aspects of the present disclosure.

FIG. 22 illustrates a communications device 2200 that may include various components (e.g., corresponding to means-plus-function components) configured to perform operations for the techniques disclosed herein, such as the operations illustrated in FIG. 12. The communications device 2200 includes a processing system 2202 coupled to a transceiver 2208. The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/memory 2212 is configured to store instructions (e.g., computer-executable code) that when executed by the processor 2204, cause the processor 2204 to perform the operations illustrated in FIG. 12. In certain aspects, computer-readable medium/memory 2212 stores code 2222 for transmitting to an assisting node an indication of resources available for sidelink communications between a first UE and a second UE, code 2224 for transmitting, signaling that configures the assisting node to repeat sidelink communications between the first and the second UEs over the indicated resources, and code 2226 for monitoring operations of the assisting node that repeats sidelink communications between the first and the second UEs according to the signaling. In certain aspects, the processor 2204 has circuitry configured to implement the code stored in the computer-readable medium/memory 2212. The processor 2204 includes circuitry 2232 for transmitting an indication of resources available for sidelink communications between a first UE and a second UE, circuitry 2234 for transmitting, signaling that configures the assisting node to repeat sidelink communications between the first and the second UEs over the indicated resources, and circuitry 2236 for monitoring operations of the assisting node that repeats sidelink communications between the first and the second UEs according to the signaling.

Figure 23:
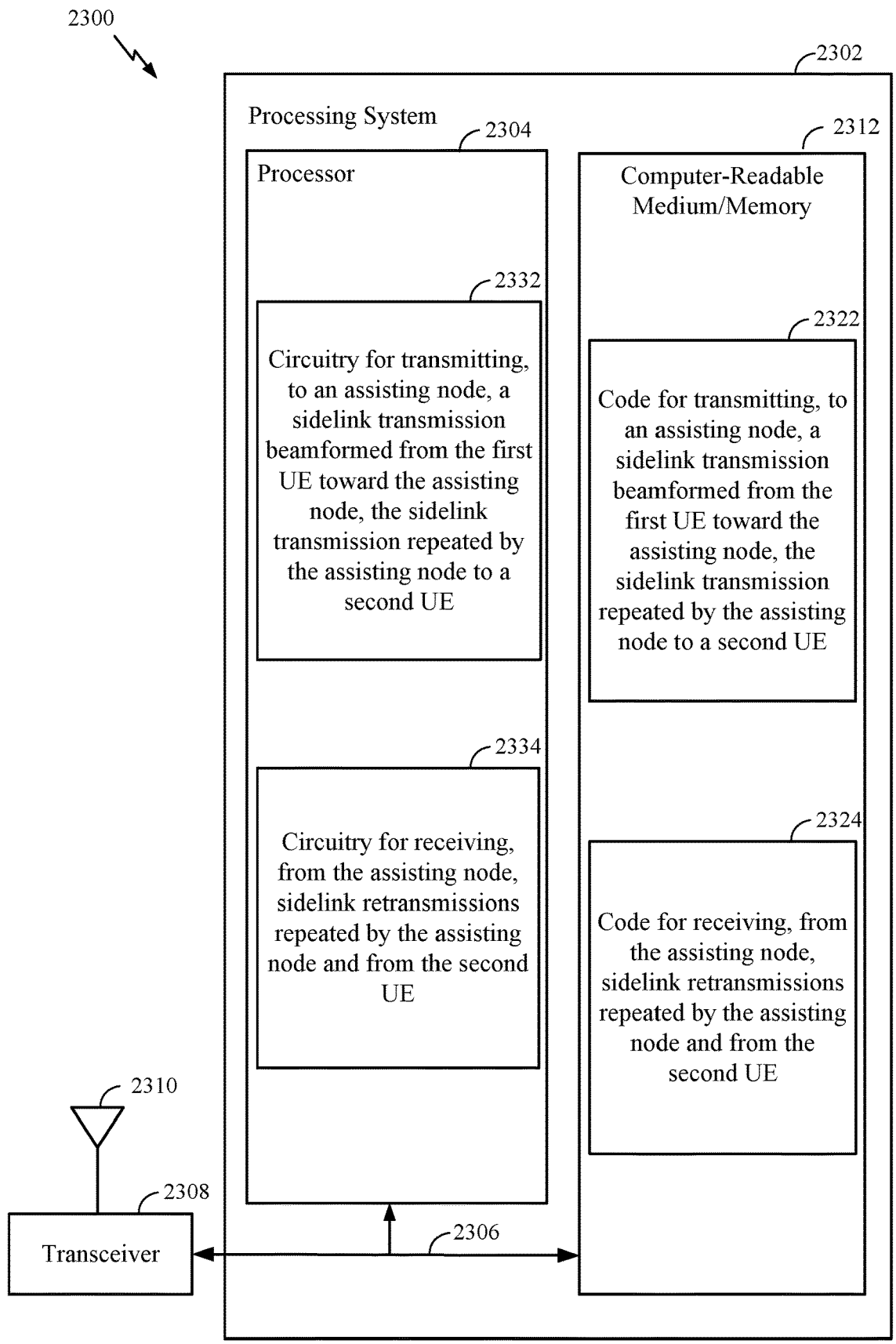
FIG. 23 illustrates a communications device that may include various components configured to perform the operations illustrated in FIG. 13, in accordance with certain aspects of the present disclosure.

FIG. 23 illustrates a communications device 2300 that may include various components (e.g., corresponding to means-plus-function components) configured to perform operations for the techniques disclosed herein, such as the operations illustrated in FIG. 13. The communications device 2300 includes a processing system 2302 coupled to a transceiver 2308. The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2313 via a bus 2306. In certain aspects, the computer-readable medium/memory 2313 is configured to store instructions (e.g., computer-executable code) that when executed by the processor 2304, cause the processor 2304 to perform the operations illustrated in FIG. 13. In certain aspects, computer-readable medium/memory 2313 stores code 2323 for transmitting, to an assisting node, a sidelink transmission beamformed from the first UE toward the assisting node, the sidelink transmission repeated by the assisting node to a second UE, and code 2324 for receiving, from the assisting node, sidelink retransmissions repeated by the assisting node and from the second UE. In certain aspects, the processor 2304 has circuitry configured to implement the code stored in the computer-readable medium/memory 2313. The processor 2304 includes circuitry 2332 for transmitting, to an assisting node, a sidelink transmission beamformed from the first UE toward the assisting node, the sidelink transmission repeated by the assisting node to a second UE, and circuitry 2334 for receiving, from the assisting node, sidelink retransmissions repeated by the assisting node and from the second UE.

EXAMPLE ASPECTS

Aspect 1: A method for wireless communications by an assisting node, comprising: receiving, from a network entity, an indication of resources available for sidelink communications between a first user equipment (UE) and a second UE; receiving, from the network entity, signaling that configures the assisting node to repeat sidelink communications between the first and the second UEs over the indicated resources; and repeating sidelink communications between the first and the second UEs according to the received signaling.

Aspect 2: The method of Aspect 1, further comprising: reporting, to the network entity, a capability of the assisting node on participating in at least one of a Uu interface or a sidelink interface in association with one of the first or the second UE.

Aspect 3: The method of Aspect 2, further comprising: receiving, from the network entity, one or more sidelink resource configurations, wherein the one or more sidelink resource configurations are determined based on at least one of: a request from the assisting node or the capability reported.

Aspect 4: The method of Aspect 3, wherein the one or more sidelink resource configurations comprise indications of one or more sidelink slots for the assisting node to repeat the sidelink communications between the first and the second UEs, wherein the one or more sidelink slots include a starting slot and a duration for repeating operation.

Aspect 5: The method of Aspect 4, wherein the signaling received from the network entity comprises a bitmap indicating a status on the one or more sidelink slots.

Aspect 6: The method of Aspect 3, wherein the request from the assisting node comprises an indication of availability of the assisting node at one or more time instants.

Aspect 7: The method of Aspect 1, wherein the indication of resources available for sidelink communications comprises slots for one or more sidelink resource pools, and wherein the signaling comprises sidelink resource pool configurations for the one or more sidelink resource pools.

Aspect 8: The method of Aspect 7, further comprising: receiving, from the network entity, a downlink control information (DCI) for a sidelink grant for one of the first or the second UE; and activating the repeating of the sidelink communications at one or more sidelink instants when one of the first or the second UE is scheduled, according to the sidelink grant, to transmit to another one of the first or the second UE.

Aspect 9: The method of Aspect 8, wherein activating the repeating of the sidelink communications comprises activating the repeating of the sidelink communications for sidelink slots that belong to a specific resource pool.

Aspect 10: The method of Aspect 9, wherein activating the repeating of the sidelink communications is based on a hybrid automatic repeat request (HARQ) feedback transmitted from at least one of the first and the second UEs to the network entity.

Aspect 11: The method of Aspect 9, wherein the signaling comprises one or more bit fields indicating the specific resource pool for activating the repeating of the sidelink communications.

Aspect 12: The method of Aspect 9, wherein the signaling comprises a start time, and a stop time or a duration of the repeating.

Aspect 13: The method of Aspect 7, wherein the signaling comprises a beam configuration for the assisting node to perform beamforming with at least one of the first UE or the second UE.

Aspect 14: The method of Aspect 1, wherein repeating the sidelink communications comprises: repeating retransmissions of sidelink communications between the first and the second UEs; and adjusting beam directions for reception and transmission with the first and the second UEs.

Aspect 15: The method of Aspect 14, wherein repeating the sidelink communications comprises: repeating one or both of physical sidelink control channel (PSCCH) and physical sidelink shared channel (PSSCH) retransmissions only.

Aspect 16: The method of Aspect 14, wherein repeating the sidelink communications comprises: repeating retransmissions of physical sidelink control channel (PSCCH), physical sidelink shared channel (PSSCH), and physical sidelink feedback channel (PSFCH).

Aspect 17: The method of Aspect 16, further comprising varying beam widths for repeating the retransmissions of PSCCH, PSSCH, and PSFCH.

Aspect 18: The method of Aspect 1, further comprising: receiving, from the network entity, an indication of configuration of physical sidelink feedback channel (PSFCH) transmissions of the first and the second UEs; and detecting PSFCH for each sidelink transmission by the first and the second UEs.

Aspect 19: The method of Aspect 18, further comprising: switching on for a next scheduled sidelink retransmission upon detecting a negative acknowledgement (NACK) in the PSFCH.

Aspect 20: The method of Aspect 1, further comprising: receiving an initial sidelink transmission from one of the first and the second UEs, wherein the initial sidelink transmission is beamformed from the one of the first and the second UEs to the assisting node; and repeating the initial sidelink transmission to another one of the first and the second UEs.

Aspect 21: The method of Aspect 1, wherein repeating the sidelink communications comprises relaying or reflecting the sidelink communications between the first and the second UEs.

Aspect 22: A method for wireless communications by a network entity, comprising: transmitting, to an assisting node, an indication of resources available for sidelink communications between a first user equipment (UE) and a second UE; transmitting, to the assisting node, signaling that configures the assisting node to repeat sidelink communications between the first and the second UEs over the indicated resources; and monitoring operations of the assisting node that repeats sidelink communications between the first and the second UEs according to the signaling.

Aspect 23: The method of Aspect 22, further comprising: receiving, from the assisting node, an indication of a capability of the assisting node on participating in at least one of a Uu interface or a sidelink interface in association with one of the first UE or the second UE.

Aspect 24: The method of Aspect 23, further comprising: transmitting, to the assisting node, one or more sidelink resource configurations, wherein the one or more sidelink resource configurations are determined based on at least one of: a request from the assisting node or the capability reported.

Aspect 25: The method of Aspect 24, wherein the one or more sidelink resource configurations comprise indications of one or more sidelink slots for the assisting node to repeat the sidelink communications between the first and the second UEs, wherein the one or more sidelink slots include a starting slot and a duration for repeating operation.

Aspect 26: The method of Aspect 25, wherein the signaling received from the network entity comprises a bitmap indicating a status on the one or more sidelink slots.

Aspect 27: The method of Aspect 24, wherein the request from the assisting node comprises an indication of availability of the assisting node at one or more time instants.

Aspect 28: The method of Aspect 22, wherein the indication of resources available for sidelink communications comprises slots for one or more sidelink resource pools, and wherein the signaling comprises sidelink resource pool configurations for the one or more sidelink resource pools.

Aspect 29: The method of Aspect 28, further comprising: transmitting, to the assisting node, a downlink control information (DCI) for a sidelink grant for one of the first or the second UE.

Aspect 30: A method for wireless communications by a first user equipment (UE), comprising: transmitting, to an assisting node, a sidelink transmission beamformed from the first UE toward the assisting node, the sidelink transmission repeated by the assisting node to a second UE; and receiving, from the assisting node, sidelink retransmissions repeated by the assisting node and from the second UE.

Aspect 31: The method of Aspect 30, wherein the sidelink transmission beamformed from the first UE to the assisting node is an initial sidelink transmission.

Aspect 32: The method of Aspect 31, wherein the sidelink retransmission repeated by the assisting node and from the second UE is in response to the initial sidelink transmission.

Aspect 33: An assisting node for wireless communications, comprising: means for receiving, from a network entity, an indication of resources available for sidelink communications between a first user equipment (UE) and a second UE; means for receiving, from the network entity, signaling that configures the assisting node to repeat sidelink communications between the first and the second UEs over the indicated resources; and means for repeating sidelink communications between the first and the second UEs according to the received signaling.

Aspect 34: A non-transitory computer readable medium storing instructions that when executed by an assisting node cause the assisting node to: receive, from a network entity, an indication of resources available for sidelink communications between a first user equipment (UE) and a second UE; receive, from the network entity, signaling that configures the assisting node to repeat sidelink communications between the first and the second UEs over the indicated resources; and repeat sidelink communications between the first and the second UEs according to the received signaling.

Aspect 35: A processing system, comprising: a memory comprising computer-executable instructions; one or more processors configured to execute the computer-executable instructions and cause the processing system to perform a method in accordance with any one of Aspects 1-32.

Aspect 36: A processing system, comprising means for performing a method in accordance with any one of Aspects 1-32.

Aspect 37: A non-transitory computer-readable medium comprising computer-executable instructions that, when executed by one or more processors of a processing system, cause the processing system to perform a method in accordance with any one of Aspects 1-32.

Aspect 38: A computer program product embodied on a computer-readable storage medium comprising code for performing a method in accordance with any one of Aspects 1-32.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 11-13 may be performed by various processors shown in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11-13.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A reconfigurable intelligent surface (RIS) for wireless communications, the RIS comprising:
    memory comprising computer executable code; and
    one or more processors coupled with the memory and configured to, individually or collectively, execute the computer executable code to cause the RIS to:
        receive, from a network entity, an indication of resources available for sidelink communications between a first user equipment (UE) and a second UE, wherein the indication of the resources comprises one or more sidelink resource configurations including indications of one or more sidelink slots for the RIS to repeat the sidelink communications between the first and the second UEs, and wherein the one or more sidelink slots include a starting slot and a duration for repeating operation;
        receive, from the network entity, signaling that configures the RIS to repeat the sidelink communications between the first UE and the second UE over the indicated resources;
        receive an initial sidelink transmission from the first UE, wherein the initial sidelink transmission is beamformed from the first UE to the RIS; and
        repeat the initial sidelink transmission, wherein repeating the initial sidelink transmission comprises reflecting the initial sidelink transmission to the second UE according to the received signaling.

2. The RIS of claim 1, wherein the one or more processors are configured to cause the RIS further to report, to the network entity, a capability of the RIS on participating in at least one of a Uu interface or a sidelink interface in association with one of the first or the second UE.

3. The RIS of claim 2, wherein the one or more sidelink resource configurations are based on at least one of: a request from the RIS or the capability reported.

4. The RIS of claim 1, wherein the signaling received from the network entity comprises a bitmap indicating a status on the one or more sidelink slots.

5. The RIS of claim 3, wherein the request from the RIS comprises an indication of availability of the RIS at one or more time instants.

6. A reconfigurable intelligent surface (RIS) for wireless communications, the RIS comprising:
  memory comprising computer executable code; and
  one or more processors coupled with the memory and configured to, individually or collectively, execute the computer executable code to cause the RIS to:
    receive, from a network entity, an indication of resources available for sidelink communications between a first user equipment (UE) and a second UE, wherein the indication of resources available for sidelink communications comprises slots for one or more sidelink resource pools, and wherein the indication comprises sidelink resource pool configurations for the one or more sidelink resource pools;
    receive, from the network entity, signaling that configures the RIS to repeat the sidelink communications between the first UE and the second UE over the indicated resources, wherein the signaling comprises a downlink control information (DCI) for a sidelink grant for one of the first or the second UE;
    activate repeating of the sidelink communications at one or more sidelink instants when the one of the first or the second UE is scheduled, according to the sidelink grant, to transmit to another one of the first or the second UE;
    receive an initial sidelink transmission from the first UE, wherein the initial sidelink transmission is beamformed from the first UE to the RIS; and
    in response to the activation of the repeating, repeat the initial sidelink transmission, wherein repeating the initial sidelink transmission comprises reflecting the initial sidelink transmission to the second UE according to the received signaling.

7. The RIS of claim 6, wherein the one or more processors are configured to cause the RIS to activate the repeating of the sidelink communications by activating the repeating of the sidelink communications for sidelink slots that belong to a specific resource pool of the one or more sidelink resource pools.

8. The RIS of claim 7, wherein activating the repeating of the sidelink communications is based on a hybrid automatic repeat request (HARQ) feedback transmitted from at least one of the first UE and the second UEs to the network entity.

9. The RIS of claim 7, wherein the signaling comprises one or more bit fields indicating the specific resource pool for activating the repeating of the sidelink communications.

10. The RIS of claim 7, wherein the signaling comprises a start time and a stop time or a duration of the repeating.

11. The RIS of claim 6, wherein the signaling comprises a beam configuration for the RIS to perform beamforming with at least one of the first UE or the second UE.

12. A reconfigurable intelligent surface (RIS) for wireless communications, the RIS comprising:
  memory comprising computer executable code; and
  one or more processors coupled with the memory and configured to, individually or collectively, execute the computer executable code to cause the RIS to:
    receive, from a network entity, an indication of resources available for sidelink communications between a first user equipment (UE) and a second UE;
    receive, from the network entity, signaling that configures the RIS to repeat the sidelink communications between the first UE and the second UE over the indicated resources;
    receive an initial sidelink transmission from the first UE, wherein the initial sidelink transmission is beamformed from the first UE to the RIS;
    repeat the initial sidelink transmission, wherein repeating the initial sidelink transmission comprises reflecting the initial sidelink transmission to the second UE according to the received signaling;
    repeat retransmissions of the initial sidelink transmission between the first UE and the second UE; and
    adjust beam directions for reception and transmission with the first UE and the second UE.

13. The RIS of claim 12, wherein the one or more processors are configured to cause the RIS to repeat one or both of physical sidelink control channel (PSCCH) retransmissions and physical sidelink shared channel (PSSCH) retransmissions.

14. The RIS of claim 12, wherein the one or more processors are configured to cause the RIS to repeat physical sidelink control channel (PSCCH) retransmissions, physical sidelink shared channel (PSSCH) retransmissions, and physical sidelink feedback channel (PSFCH) retransmissions.

15. The RIS of claim 14, wherein the one or more processors are configured to cause the RIS further to vary beam widths for repeating different retransmissions.

16. A reconfigurable intelligent surface (RIS) for wireless communications, the RIS comprising:
  memory comprising computer executable code; and
  one or more processors coupled with the memory and configured to, individually or collectively, execute the computer executable code to cause the RIS to:
    receive, from a network entity, an indication of resources available for sidelink communications between a first user equipment (UE) and a second UE;
    receive, from the network entity, signaling that configures the RIS to repeat the sidelink communications between the first UE and the second UE over the indicated resources;
    receive, from the network entity, an indication of configuration of physical sidelink feedback channel (PSFCH) transmissions of the first UE and the second UE;
    receive an initial sidelink transmission from the first UE, wherein the initial sidelink transmission is beamformed from the first UE to the RIS;
    repeat the initial sidelink transmission, wherein repeating the initial sidelink transmission comprises reflecting the initial sidelink transmission to the second UE according to the received signaling; and
    detect PSFCH for each sidelink transmission by the first UE and the second UE.

17. The RIS of claim 16, wherein the one or more processors are configured to cause the RIS further to switch on for a next scheduled sidelink retransmission upon detecting a negative acknowledgement (NACK) in the PSFCH.

18. A network entity for wireless communications, the network entity comprising:

memory comprising computer executable code; and one or more processors coupled with the memory and configured to, individually or collectively, execute the computer executable code to cause the network entity to:

transmit, to a reconfigurable intelligent surface (RIS), an indication of resources available for sidelink communications between a first user equipment (UE) and a second UE, wherein the indication of the resources comprises one or more sidelink resource configurations including indications of one or more sidelink slots for the RIS to repeat the sidelink communications between the first and the second UEs, and wherein the one or more sidelink slots include a starting slot and a duration for repeating operation;

transmit, to the RIS, signaling that configures the RIS to repeat the sidelink communications between the first UE and the second UE over the indicated resources; and monitor operations of the RIS that repeats an initial sidelink transmission from the first UE, wherein repeating the initial sidelink transmission comprises reflecting the initial sidelink transmission to the second UE according to the signaling.

19. The network entity of claim 18, wherein the one or more processors are configured to cause the network entity further to receive, from the RIS, an indication of a capability of the RIS on participating in at least one of a Uu interface or a sidelink interface in association with one of the first UE or the second UE.

20. The network entity of claim 19, wherein the one or more sidelink resource configurations are determined based on at least one of: a request from the RIS or the capability reported.

21. The network entity of claim 18, wherein the signaling to the RIS comprises a bitmap indicating a status on the one or more sidelink slots.

22. The network entity of claim 20, wherein the request from the RIS comprises an indication of availability of the RIS at one or more time instants.

* * * * *